(12) United States Patent
Paxson

(10) Patent No.: US 8,091,017 B2
(45) Date of Patent: Jan. 3, 2012

(54) METHOD AND APPARATUS FOR ELECTRONIC LITERARY MACRAMÉ COMPONENT REFERENCING

(76) Inventor: Dana W. Paxson, Rochester, NY (US)

( * ) Notice: Subject to any disclaimer, the term of this patent is extended or adjusted under 35 U.S.C. 154(b) by 989 days.

(21) Appl. No.: 11/828,083

(22) Filed: Jul. 25, 2007

(65) Prior Publication Data

US 2008/0037879 A1 Feb. 14, 2008

Related U.S. Application Data

(60) Provisional application No. 60/909,197, filed on Mar. 30, 2007, provisional application No. 60/833,201, filed on Jul. 25, 2006.

(51) Int. Cl.
*G06F 17/00* (2006.01)
(52) U.S. Cl. .................. 715/208; 715/206
(58) Field of Classification Search .................. 715/200, 715/206, 207, 255, 205, 208, 227
See application file for complete search history.

(56) References Cited

U.S. PATENT DOCUMENTS

| | | | |
|---|---|---|---|
| 5,343,239 A | 8/1994 | Lappington | |
| 5,745,360 A | 4/1998 | Leone | |
| 5,794,257 A * | 8/1998 | Liu et al. ......................... | 715/205 |
| 5,809,317 A * | 9/1998 | Kogan et al. ................... | 715/236 |
| 5,887,171 A | 3/1999 | Tada | |
| 5,901,332 A | 5/1999 | Gephardt | |
| 5,987,472 A * | 11/1999 | Serafin ................................. | 1/1 |
| 6,125,385 A | 9/2000 | Wies | |
| 6,236,994 B1 | 5/2001 | Swartz | |
| 6,314,415 B1 | 11/2001 | Mukherjee | |
| 6,331,867 B1 | 12/2001 | Eberhard | |
| 6,356,287 B1 | 3/2002 | Ruberry | |
| 6,453,329 B1 | 9/2002 | Dodgen | |
| 6,585,776 B1 * | 7/2003 | Bates et al. ..................... | 715/206 |
| 6,684,369 B1 | 1/2004 | Bernardo et al. | |
| 6,766,362 B1 | 7/2004 | Miyasaka | |
| 6,772,139 B1 * | 8/2004 | Smith, III ...................... | 707/748 |
| 6,966,029 B1 | 11/2005 | Ahern | |
| 6,968,455 B2 | 11/2005 | Okayasu | |
| 7,171,618 B2 | 1/2007 | Harrington | |

(Continued)

FOREIGN PATENT DOCUMENTS

JP 2002086964 3/2002

OTHER PUBLICATIONS

Dale et al., Integrating Natural Language Generation and Hypertext to Produce Dynamic Documents, Google 1998, pp. 109-135.*

(Continued)

*Primary Examiner* — Cong-Lac Huynh
(74) *Attorney, Agent, or Firm* — Hiscock & Barclay, LLP

(57) ABSTRACT

An expansion of the construction and organization of the electronic literary macramé (ELM), the knowledge transfer tool (KTT), or any document of similar type to enrich the connections and associations for their readers, providing for manual author- or editor-defined links and directives for hypertext handling and navigation, easy-to-use indexing capabilities, structuring and presentation of information in a visually-organized form such as a table, list, matrix, tree, pyramid, or other two-dimensional arrangement, with all features integrated into an unobtrusive, and enriched referencing mechanism to assist authors, editors and readers of an ELM, KTT, or other electronic document of similar type.

40 Claims, 18 Drawing Sheets

U.S. PATENT DOCUMENTS

| | | | |
|---|---|---|---|
| 7,240,209 B2 | 7/2007 | Carro | |
| 7,290,205 B2 | 10/2007 | Moncsko | |
| 7,426,687 B1 | 9/2008 | Schultz | |
| 7,680,760 B2* | 3/2010 | Davies et al. | 707/758 |
| 7,765,473 B2 | 7/2010 | Buckley | |
| 2001/0039002 A1 | 11/2001 | Delehanty | |
| 2002/0000990 A1 | 1/2002 | Schauser | |
| 2002/0065964 A1 | 5/2002 | Lemke | |
| 2002/0078343 A1 | 6/2002 | Rubin | |
| 2002/0087969 A1* | 7/2002 | Brunheroto et al. | 725/13 |
| 2002/0091991 A1 | 7/2002 | Castro | |
| 2002/0108109 A1* | 8/2002 | Harris et al. | 725/32 |
| 2002/0118860 A1 | 8/2002 | Pasqua | |
| 2002/0133464 A1 | 9/2002 | Ress | |
| 2002/0152245 A1 | 10/2002 | McCaskey | |
| 2002/0178185 A1 | 11/2002 | Kuchinsky | |
| 2002/0184189 A1 | 12/2002 | Hay | |
| 2003/0014445 A1 | 1/2003 | Formanek | |
| 2003/0078888 A1 | 4/2003 | Lee | |
| 2003/0159566 A1 | 8/2003 | Sater | |
| 2003/0190054 A1 | 10/2003 | Troyansky | |
| 2003/0229611 A1* | 12/2003 | Hintenach | 707/1 |
| 2004/0091132 A1 | 5/2004 | Eguchi | |
| 2004/0128624 A1* | 7/2004 | Arellano et al. | 715/530 |
| 2004/0181543 A1* | 9/2004 | Wu et al. | 707/102 |
| 2004/0199871 A1* | 10/2004 | Lee | 715/513 |
| 2004/0205497 A1* | 10/2004 | Alexander et al. | 715/501.1 |
| 2004/0230327 A1 | 11/2004 | Opheim | |
| 2004/0230457 A1 | 11/2004 | Rosenbloom | |
| 2004/0268230 A1 | 12/2004 | Liu | |
| 2005/0019740 A1 | 1/2005 | Cunningham | |
| 2005/0028098 A1* | 2/2005 | Harrington et al. | 715/530 |
| 2005/0055624 A1 | 3/2005 | Seeman | |
| 2005/0076296 A1 | 4/2005 | Lee | |
| 2005/0149851 A1 | 7/2005 | Mittal | |
| 2005/0246635 A1 | 11/2005 | Hirose | |
| 2005/0251731 A1 | 11/2005 | Valderas | |
| 2005/0283719 A1 | 12/2005 | Awamoto | |
| 2006/0036940 A1 | 2/2006 | Hsiu-Ping | |
| 2006/0075241 A1 | 4/2006 | Deguillaume | |
| 2006/0123107 A1* | 6/2006 | Chen | 709/224 |
| 2006/0150228 A1 | 7/2006 | Kelly | |
| 2006/0173951 A1 | 8/2006 | Arteaga | |
| 2007/0073833 A1 | 3/2007 | Roy | |
| 2007/0087316 A1 | 4/2007 | Arnold | |
| 2007/0101263 A1 | 5/2007 | Bedingfield, Sr. | |
| 2007/0118801 A1 | 5/2007 | Harshbarger | |
| 2007/0136674 A2 | 6/2007 | Schumacher | |
| 2007/0150829 A1 | 6/2007 | Eschbach | |
| 2007/0162878 A1 | 7/2007 | Lee | |
| 2007/0204211 A1 | 8/2007 | Paxson | |
| 2007/0299914 A1 | 12/2007 | Jones | |
| 2008/0025559 A1 | 1/2008 | Paxson | |
| 2008/0027822 A1 | 1/2008 | Paxson | |
| 2008/0028297 A1 | 1/2008 | Paxson | |
| 2008/0141182 A1 | 6/2008 | Barsness | |
| 2008/0189648 A1* | 8/2008 | Anglin et al. | 715/781 |
| 2008/0193101 A1* | 8/2008 | Agnihotri et al. | 386/52 |
| 2008/0216022 A1 | 9/2008 | Lorch | |
| 2008/0301074 A1* | 12/2008 | Dozier | 706/21 |
| 2008/0301698 A1* | 12/2008 | Badaloo et al. | 718/107 |
| 2009/0150612 A1* | 6/2009 | Cooper et al. | 711/115 |
| 2010/0100800 A1* | 4/2010 | Cote et al. | 715/208 |
| 2011/0047152 A1* | 2/2011 | Smith, III | 707/723 |

OTHER PUBLICATIONS

Weiss et al., HyPursuit: A Hierarchical Network Serach Engine that Exploits Content-Link Hypertext Clustering, ACM 1996, pp. 180-193.*

Barrett, Create Your Own Electronic Portfolio, Google 2000, pp. 14-21.*

Czyzowicz et al., Enhancing Hyperlink Structure for Improving Web Performance, Google 2003, pp. 1-28.*

Anderson, Applicability of Normal Forms in Hyperlink Database Structure, Google 2000, pp. 1-50.*

International Search Report and Written Opinion in corresponding PCT application (PCT/US07/62801) dated Jun. 3, 2008 (total 13 pages).

York et al., "Human-computer interaction issues for mobile computing in a variable work context," Google 2004, pp. 771-797.

Sittig et al., "Techniques for identifying the applicability of new information management technologies in the clinical setting: an example focusing on handheld computers," Google 2000, pp. 804-808.

Schmalsteig et al., "Experiences with handheld augmented reality," Google 2007, pp. 1-13.

Schaffer, Michael D. and John-All, Annette, "Electronic circulation of books at hand," Philadelphia Inquirer, business Section, P. D01, May 24, 2000.

Salopek, J. J., "Books, buttons, and beyond," Training & Development, vol. 54, No. 6, pp. 77-78, Jun. 2000.

Reid, C., "E-lit support group formed," Publishers Weekly, vol. 247, No. 32, p. 57, Aug. 7, 2000.

Pearson, S.B., "Heading Into Uncharted Territory? (Updating Marine Navigation Charts)," Cruising World, vol. 25, No. 9, p. 106, Sep. 1999.

Patten et al., "Designing Collaborative Constructionist and Contestual Applications for Handheld Devices," Google 2006, pp. 294-308.

Ojala, M., "The European online scene," Searcher, vol. 4, No. 3, p. 22, Mar. 1996.

Ojala, M., "Reviewing google book search," Online, vol. 30, No. 2, p. 12, Mar.-Apr. 2006.

Marshall et al., "Reading in the small: A study of reading on small form factor devices," ACM 2002, pp. 56-64.

Holzberg, C. S., "Off with their heads!" CD-ROM World, vol. 9, No. 7, pp. 78-79, Jul./Aug. 1994.

Hilts, P. "Dial-a-book: Very direct marketing," Publishers Weekly, vol. 242, No. 6, p. 29, Feb. 6, 1995.

Guinn, J, "So you want to write a book? Here are Tips to get it published," Miami Herald, Broward edition, Living section, p. 5E, Aug. 16, 2001.

Fies et al., "Classroom response systems: A review of the literature," Google, Mar. 2006, pp. 101-109.

Ditlea, S., "The real e-books," Technology Review, Vo. 103, No. 4, pp. 70-78, Jul.-Aug. 2000.

Cavanaugh, "Ebooks and Accommodations: Is this the future of print accommodations?" Google 2002, pp. 56-61.

Baron, D., "The Madness of Roland: an Ambition, and Difficult, Interactive Novel," Digital Media, vol. 2, No. 10-11, p. 17, Mar. 29, 1993.

Ardito, (Electronic Books: To "E" or not to "E": That is the question, Sarcher vol. 8, No. 4, p. 28, Apr. 2000.

Anon., "Tales that let you" Statesman (India), Nov. 14, 2004.

Anon., "New Stephen King eBook Exclusive to be available througn netLibrary and peanutpress.com," Business Wire, p. 0049, Mar. 8, 2000.

Anon., "Special TMC Labs Review: Skills-based Routing: Matchmaking and the Call Center, Part II," Call Center Solutions, vol. 18, No. 11, pp. 94-100, May 2000.

Anon., "Database Confidential," Data Based Advisor, vol. 14, No. 10, p. 98, Oct. 1996.

Anon., "Austin, Texas, Startup Transforms Big Publishers' Content for Online Use," Austin American-Statement, Mar. 13, 2000.

Andres, C., "Authoring Software Offers Multiple Choices," MacWeek, vol. 5, No. 22, p. 30, Jun. 11, 1991.

Anon., "The Future of the Printed Word Seems Smudgy," Financial Express, Nov. 12, 2005.

Anon., "InterGO: Industry's First Enriched Internet Software Is Now Available Worldwide," Business Wire, p. 01031195, Jan. 3, 1996.

* cited by examiner

METHOD AND APPARATUS FOR ELECTRONIC LITERARY MACRAMÉ COMPONENT REFERENCING

REFERENCE TO RELATED APPLICATIONS

This application claims the benefit of U.S. Provisional Application No. 60/833,201, filed Jul. 25, 2006, entitled "Multiple Improvement in Method and Apparatus for Creating Literary Macrames," U.S. Provisional Application No. 60/909,197, filed Mar. 30, 2007, entitled "Game Scene Replay Director: A tool for Filmmaking Storytellers."PCT Application No. PCT/US2007/062801, filed Feb. 26, 2007, entitled "Apparatus and Method for Creating Literary Macrames,"and U.S. Nonprovisional application Ser. No. 11/361,439, filed Feb. 24, 2006 (now U.S. Pat. No. 7,810,021, issued Oct. 5, 2010), entitled "Apparatus and Method for Creating Literary Macramés", all of which are hereby incorporated by reference. Reference is also made to related U.S. Nonprovisional application Ser. No. 11/782,976, filed Jul. 25, 2007 (now U.S. Pat No. 7,555,138, issued Jun. 30, 2009), entitled "Method and Apparatus for Digital Watermarking for Electronic Literary Macramé," U.S. Nonprovisional application Ser. No. 11/828,238, filed Jul. 25, 2007, entitled "Method and Apparatus for Presenting Electronic Literary Macramés on Handheld Computer Systems,"U.S. Nonprovisional application Ser. No. 11/828,083, filed Jul. 25, 2007, entitled "Method and apparatus for Electronic Literary Maramé Component Referencing," and U.S. Nonprovisional application Ser. No. 11/828,010, filed Jul. 25, 2007, entitled "Method and Apparatus for Electronic Literary Macramé Business Development,"all of which are hereby incorporated by reference.

AREA OF INVENTION

This disclosure relates to the creation of texts readable on computers, and more specifically to the linking, indexing, and tabulation of interconnected narratives and references readable using browser programs such as those adapted for use on the World Wide Web.

BACKGROUND OF THE INVENTION

To illustrate and provide background for the present method and apparatus, the patent application titled "Apparatus and Method for Creating Literary Macramés", U.S. patent application Ser. No. 11/361,439, by the present inventor, is incorporated herein by reference. A literary macramé, also called here an 'ELM', or electronic literary macramé, is a form of text offering readers advantages over other forms of literature in referencing and tracing connections.

To provide further background and support for the present method and apparatus, the patent application titled "The Knowledge Transfer Tool: An Apparatus And Method For Knowledge Transfer", International Application No. PCT/US2007/062801, also by the present inventor, is also incorporated herein by reference. The Knowledge Transfer Tool, also called here a 'KTT', combines ELM characteristics and capabilities with rule-based expert system and programmed-instruction components to allow authors to produce immersive learning programs in literary and textbook forms on electronic media.

To provide context for ongoing developments relating to the present method and apparatus, the patent applications titled "Method And Apparatus For Electronic Literary Macramé Business Development", "Method For Presenting Electronic Literary Macramés On Handheld Computer Systems", and "Method And Apparatus For Digital Watermarking For The Electronic Literary Macramé", also by the present inventor, are additionally incorporated herein by reference.

The ELM and KTT allow great flexibility and productivity, and to accomplish their tasks effectively and with maximum utility to authors and readers, they interconnect the units or components to be consumed by readers. The profusion of routine hypertext links (hyperlinks, or links), the frequent use of visually-readable indices and tables, and the author's special associations of otherwise-disparate units or components create special challenges for the ELM and KTT technology, and indeed for any similar mechanisms and processes for interconnecting readable electronic document components. The present description hereinafter uses "ELM/KTT"to refer to all such classes of mechanisms and processes.

One opportunity for expanding ELM/KTT capabilities is in the realm of author- or editor-defined links and directives for hypertext handling and navigation. The variety and depth of literary and pedagogical effects achievable with the ELM/KTT would be considerably extended by addressing such linking and directive capabilities.

The addition of easy-to-use indexing capabilities constitutes a second opportunity for enhancement of the value of the ELM/KTT. The index to a literary or academic work is vital for readers seeking occurrences of special terms in the work, particularly if such an index can be provided so as to avoid impact of its use on the immersive experience of the reader. Such an index, in a possibly-expanded form, is highly useful to the author in the midst of developing an ELM/KTT product, especially when the author is learning or creating the terminology peculiar to the product and its realm of knowledge.

A third opportunity for extending the ELM/KTT capabilities arises when considering how authors and readers struggle with information in a visually-organized form such as a table, list, matrix, tree, pyramid, or other two-dimensionally-arranged presentation. Such structures can be integrated with links and indices in an ELM/KTT. Such structures can also be presented to readers in multiple forms, for example, each entry in a table may be shown in a glossary independently for readers who prefer such modes of presentation. Software for constructing and presenting tabular or other structured data in multiple modes would enhance the power and utility of the ELM/KTT.

All three opportunities center around a single theme: the referencing of separate components or units of the ELM/KTT from within other components or units without disrupting the work's immersive character for the reader.

SUMMARY

The present method and apparatus exploit the construction and organization of the electronic literary macramé (ELM) and the knowledge transfer tool (KTT) to expand and enrich the readers ability to reference one component of an ELM/KTT work while reading another component, smoothly and with minimal distraction.

First, the present method and apparatus provide for manual author- or editor-defined links and directives for hypertext handling and navigation, in forms which maintain the independent character of such links and directives, enabling authors and editors to adjust and maintain their definitions across all other changes to the underlying documents. Manually-provided links and directives enhance the variety and depth of literary and pedagogical effects achievable with the ELM/KTT.

Second, the present method and apparatus add easy-to-use indexing capabilities to the ELM/KTT, aiding readers seeking occurrences of special terms in the work, and supporting authors in the midst of developing an ELM/KTT product, especially when the author is learning or creating the terminology peculiar to the product and its realm of knowledge. The present method and apparatus provide such indices in such a way as to avoid impact of its use on the immersive experience of the reader.

Third, the present method and apparatus provide for structuring and presentation of information in a visually-organized form such as a table, list, matrix, tree, pyramid, or other two-dimensional arrangement. The present method and apparatus further provide for presentation of such structures to readers in multiple forms, for example, each entry in a table may be shown in a glossary independently for readers who prefer such modes of presentation.

Finally, the present method and apparatus combine the three features described above—author-defined links and directives, enriched indexing capabilities, and structured-information presentation—into an integrated, unobtrusive, and enriched referencing mechanism to assist authors, editors and readers of an ELM or KTT.

DETAILED DESCRIPTION OF THE INVENTION

Figure 1:
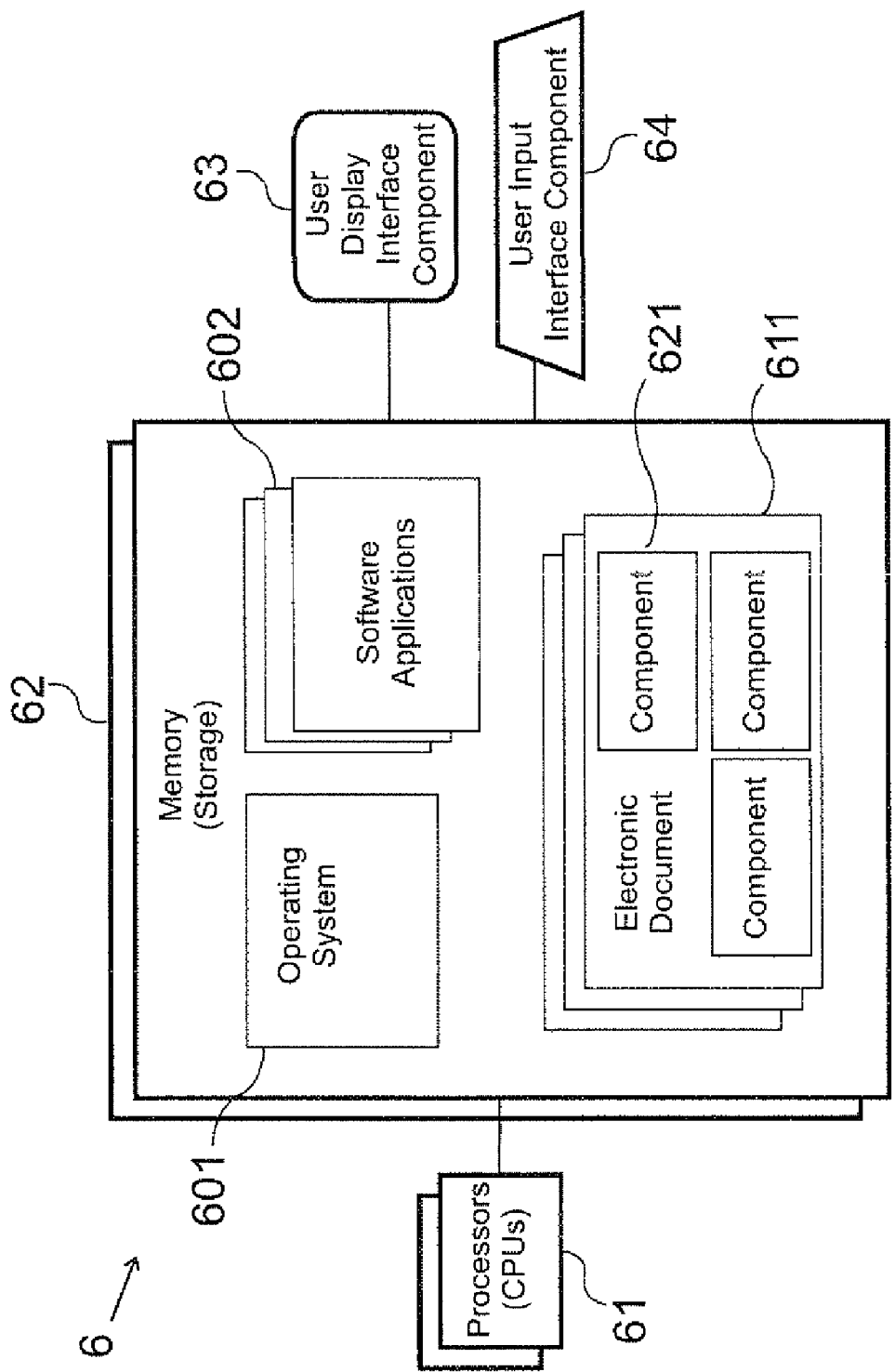
FIG. 1 shows the overview of the apparatus of the ELM/KTT.

See FIG. 1. The present apparatus comprises a computer system 6, made up of one or more processors (CPUs) 61, a user display interface component 63 such as a CRT, flat-panel display, or other viewing device, one or more user input interface components 64 such as a keyboard, a mouse, a touch panel, a scribing device such as a stylus, or some other pointing, selection, or data entry device, and one or more memory components 62. Any of the memory components 62 may hold an operating system 601, one or more software applications 602, and one or more electronic documents 611. Each electronic document 611 comprises a plurality of components 621.

The software applications 602 of the present apparatus comprise three hypertext linking programs: a first software application for generating and installing one or more hypertext link anchors in one or more of said components of each said electronic document, a second software application for generating and installing one or more hypertext links to said link anchors, in one or more of said components of each said electronic document, and a third software application for generating one or more lists of said hypertext links.

The software applications of the present apparatus further comprise two indexing programs: a fourth software application for defining, generating, and installing one or more indices in one or more components of an electronic document, and a fifth software application for defining and installing hypertext links between said indices and one or more components of an electronic document.

The software applications of the present apparatus still further comprise two programs for using author-supplied symbolic directives including symbolic links: a sixth software application for defining and installing one or more symbolic directives in one or more components of said one or more electronic documents, and a seventh software application for interpreting said one or more symbolic directives in one or more components of said one or more electronic documents.

The software applications of the present apparatus still further comprise an eighth software application for defining and installing one or more readable tables in one or more components of said one or more electronic documents.

Improvements to the ELM/KTT class of electronic documents require careful integration in order to preserve the essential immersive experience for readers. Referencing, or looking up information in the course of reading, is in conventional documents a process disruptive to concentration. In electronic documents, the availability of hypertext links simplifies and accelerates the lookup process, but introduces a different problem: the distraction presented by too many links displayed too prominently with too much irrelevance to any specific purpose of a reader. The improvements of the present method and apparatus—enriched linking and indexing, symbolic linking and directives, and structured-information management and presentation—all work together to elevate and intensify the reader's engagement with the overall work offered as an ELM or KTT output. Furthermore, considering authors as the first readers of their own works, the improvements of the present method and apparatus simplify the author's tasks in a work's preparation, and present the author with new opportunities for exploiting ideas in concerted and harmonious ways to improve the work for all other readers.

ELM/KTT Link Generation

Figure 2:
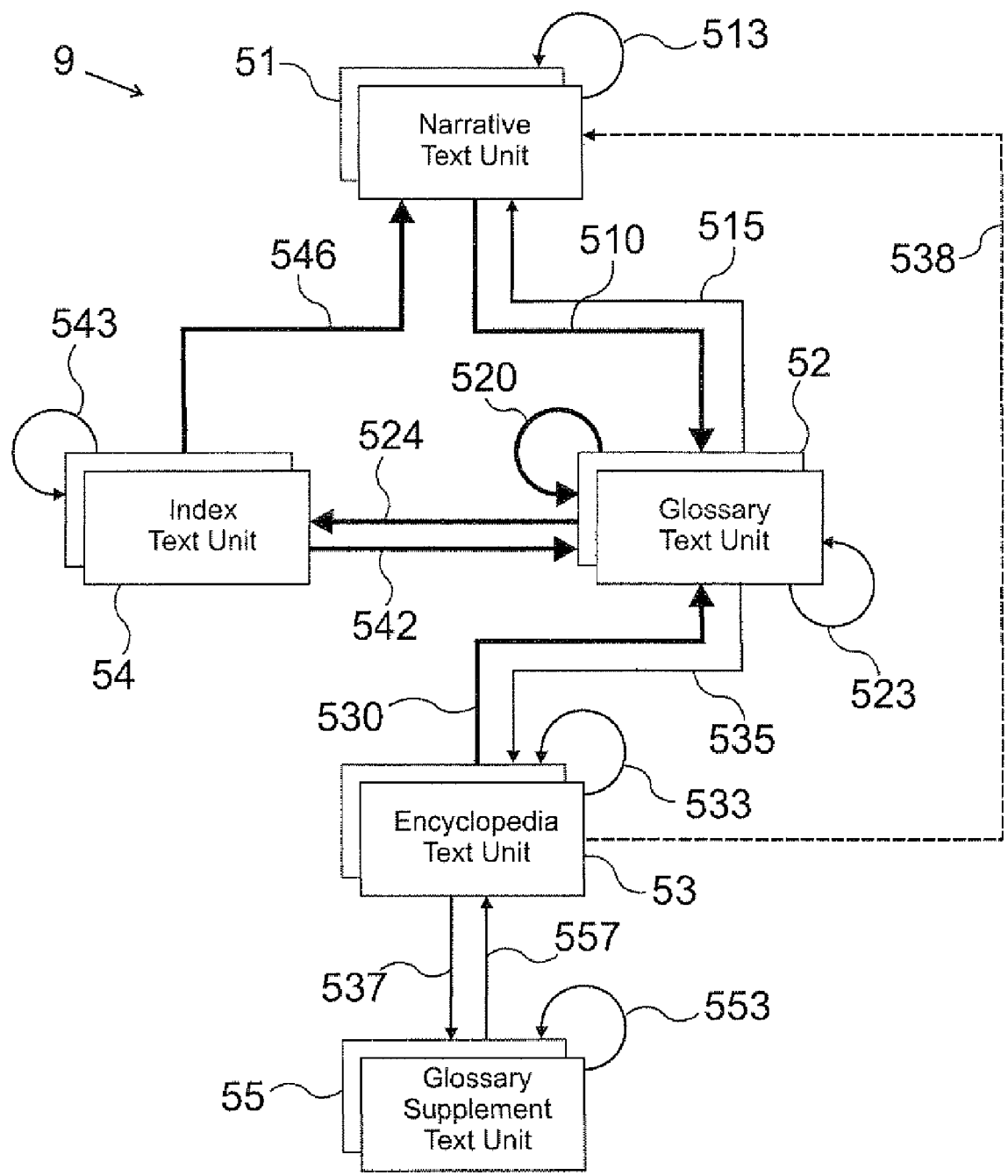
FIG. 2 shows an overview of the linking relationships among the components of the output of the present method and apparatus.

The ELM/KTT uses different classes of hypertext links as shown in FIG. 2 to assist a reader in making transitions from component to component without substantially degrading the reading experience. HTML links, derived and installed according to the art of the present method and apparatus, are the primary means for defining and making such transitions in the ELM/KTT.

FIG. 2 shows an overview of the many linking relationships in the ELM/KTT 9. Scenes, also called units or narrative text units 51, contain the primary narrative reading content of the ELM/KTT. Glossary text units 52 contain terms of significance in the ELM/KTT and their meanings or definitions. Encyclopedia (reference) text units 53 contain expository and elaborative narrative material and illustrations. Index text units 54 list all narrative text units in which each specific glossary term is found.

The principal links among components of the ELM/KTT are the links 510 from terms used in the narrative text units 51 to corresponding term definitions within the glossary units 52, the links 520 from terms used in the glossary units 52 to corresponding term definitions within the same or other glossary units 52, the links 524 from terms used in the glossary units 52 to corresponding index entries within index text units 54, the links 546 from index entries within index text units 54 to narrative text units 51, and the links 542 from index entries within index text units 54 to corresponding term definitions within the glossary units 52.

Glossary text units 52 contain additional links that enrich the connections among ELM/KTT components for a reader A link 515 from a specific term in a glossary text unit 52 to a narrative text unit 51 grants a reader direct access to a narrative thread for which the term defines a theme, character, or other significant entity. A link 535 from a specific term in a glossary text unit 52 to an encyclopedia text unit 53 directs a reader to additional expository, tabular, or otherwise structured material concerning the term.

Encyclopedia text units 53 contain tabular or list material which is used in the KTT/ELM to generate textual explanations of terms presented therein in a table, along with their contexts as defined in the table. Said textual explanations are stored in glossary supplement text units 55. Links 537 direct a reader from a tabulated term to its textual explanation, and links 557 direct the reader from the textual explanation to the table in which the term appears.

The simplest form of link connects a unit of a given type to another unit of the same type. Narrative text units 51 are linked to one another for reading via links 513. Glossary text units 52 are likewise linked to one another for browsing using links 523. Encyclopedia (reference) text units 53 are likewise linked to one another for browsing using links 533. Index text units 54 are likewise linked to one another for browsing using links 543. In an enhanced-glossary-supplement embodiment, glossary supplement text units 55, containing terms tabulated or listed in the ELM/KTT and their meanings or definitions in the tabular or list context, are likewise linked to one another for browsing using links 553.

Links inserted by an author, also called symbolic links, may appear in any component of any type and may lead to any component of any type. In FIG. 2, encyclopedia text units 53 are shown with links 538, illustrating one use of symbolic links, leading to narrative text units 51.

The reader's attention to the sequential reading experience is supported by the lack of large numbers of diverse types of links from narrative text units 51 to other components 52, 53, 54, 55. Only the links 510 to terms in glossary text units 52 lead outside the narrative text units 51.

In Table 1 are identified the current classes of links used in the ELM/KTT, including both symbolic links used by authors, and generated links used to build lists of links for symbolic file inclusion in ELM/KTT output presentations for readers. Table 1 identifies the classes of symbolic links and generated links of the present method and apparatus. Table 2 identifies classes of links already supported in the ELM/KTT, and is included to show that the features of the present method and apparatus are significant enhancements of the basic ELM/KTT.

TABLE 1

| ELM/KTT Link Classes of the Present method and apparatus | |
| --- | --- |
| 1. Initial Thread Links (FIG. 2 513) | This link class is constructed from the definitions of narrative threads defined by the author during the preparation of the ELM/KTT. These links are built as a text in HTML format (see paragraph below titled "Building and Installing Initial Thread Links"), and are added to the Introduction using the Include symbolic directive, which incorporates entire files in a text at the point of its appearance. The set of thread starting links offers readers a simple set of choices of characters/themes and threads to follow in the ELM/KTT from their respective starting points. To facilitate reader selection, a narrative passage is presented along with each link as a 'teaser' or brief summary. |
| 2. Initial Reference Links (FIG. 2 543) | This link class is constructed from the list of references defined by the author during the preparation of the ELM/KTT. These links are built as a text in HTML format (see paragraph below titled "Building and Installing Initial Reference Links"), and are added to a menu of references using the Include symbolic directive, which incorporates entire files in a text at the point of its appearance. The set of reference links offers readers a simple set of choices of references to browse or study in the ELM/KTT. To facilitate reader selection, a narrative passage is presented along with each link as a 'teaser' or brief summary. |
| 3. Scene (Unit) Starting Point Links (FIG. 2 513) | This class of links appears at the end of the ELM/KTT as a complete menu of all initial appearances of all the characters or themes identified for linking in the ELM/KTT, each link leading to a trace of links following a particular character or theme. Scene/unit starting point links are built as a text in HTML format (see paragraph below titled "Building and Installing Scene (Unit) Starting Point Links"), and are added to the final scene text using the symbolic Include directive, which incorporates entire files in a text at the point of its appearance. Each such link is accompanied by the character or theme name, the title of the first scene or unit, and an indication of whether or not the character or theme has an independent narrative to be followed. |
| 4. Character (Theme) | This class of links is constructed to provide access to narratives regarding specific characters or themes from the ELM/KTT glossary (see paragraph |

TABLE 1-continued

ELM/KTT Link Classes of the Present method and apparatus

| | |
|---|---|
| Starting Point Links (FIG. 2 515) | below titled "Building and Installing Character (Theme) Starting Point Links"). The present method and apparatus insert each member of this class of links in the glossary entry for the corresponding character or theme named in the glossary as having a narrative thread that can be followed, or appearing in a scene/unit for the first time. For example, a glossary entry for such a character, Allashani, might have a text that reads, "Allashani has a story beginning in the scene titled ALLASHANI, and is first seen in a scene titled THE ANTH." The reader perusing such a glossary entry may select either the word 'ALLASHANI' or the words "THE ANTH" to view the scene having the name given. The scene selected appears, as usual, in the main window of the ELM/KTT. |
| 5. Contents Links (FIG. 2 513) | This class of links is generated to support a table of contents (TOC) in various embodiments, containing the title and link for every scene or unit in the ELM/KTT (see paragraph below titled "Building and Installing Contents Links"). In a linear TOC embodiment, the present method and apparatus list the scene/unit titles in a primary or canonical narrative order from first to last. In a geographic TOC embodiment, the present method and apparatus present each scene/unit title for reader selection during the mouseover of a corresponding region of a graphical or narrative display. |
| 6. Glossary-to-Reference Links (FIG. 2 535) | The present method and apparatus insert members of this class of links in glossary entries for all the terms appearing prominently in reference articles, i.e., in the title, paragraph headers, or other significant place in an article (see paragraph below titled "Building and Installing Glossary-to-Reference Links"). A glossary entry for such a term will have a text that reads, for example, "More information is found in the section titled Argazindar in the reference article titled COLLS, LANGUAGES, AND MEMBERS." The reader perusing such a glossary entry may select either the word 'Argazindar' to view the section of the reference article having the term in a paragraph header, or the article title to view the head of the article. The article selected appears, as usual, in the encyclopedia, or reference, window of the ELM/KTT. |
| 7. Glossary Supplement-to-Reference Links (FIG. 2 557) | This link class comprises the set of links each of which leads a reader from a term in the newly-developed glossary supplement to a tabular presentation of terms that includes the term defined (see paragraph below titled "Building and Installing Glossary Supplement-to-Reference Links"). The form of the supplement entry is defined by a series of templates created for the table in the reference article, but the reference link to the table works in the same way as reference links do in the glossary. |
| 8. Reference-to-Glossary Supplement Links (FIG. 2 537) | This class of links is the set of links each of which takes a reader from a table entry in a reference to the text in the glossary supplement corresponding to the table entry (see paragraph below titled "Building and Installing Reference-to-Glossary Links"). The glossary supplement text is generated using the software processes of the present method and apparatus (see paragraph below titled "Building and Installing Tables" for the generation of supplement entries). |
| 9. Glossary-to-Index Links (FIG. 2 524) | Any of this class of links leads a reader from the glossary term itself directly to a corresponding index term listing for the term all of the scenes/units in which the term appears (see paragraphs below titled "Building and Installing an ELM/KTT Index" and "Building and Installing Glossary-to-Index and Index-to-Glossary Links"). Each index term list entry comprises a link to the scene or unit it identifies. |
| 10. Index-to-Glossary Links (FIG. 2 542) | Any of this class of links leads a reader from the index term itself directly to a corresponding glossary term definition, enabling the reader to toggle easily back and forth between glossary and index displays for a given term (see paragraph below titled "Building and Installing an ELM/KTT Index" and "Building and Installing Glossary-to-Index and Index-to-Glossary Links"). |
| 11. Symbolic Links (FIG. 2 538) | This class of ELM/KTT links is the set of links and their corresponding anchors which are defined as text in square brackets and placed independently by an author or editor in a text by manual means, as described in (see section below starting with the paragraph titled "Symbolic Links and Symbolic Anchors"). Although HTML could be used to do the same thing, the ELM/KTT replaces existing HTML linkages in all texts during every compilation, and such replacement introduces complications eliminated by the use of symbolic links. The symbolic links are not removed or replaced or otherwise changed by the ELM processing, since they are easily recognized and distinguished from HTML links, and protected from changes when HTML links are updated. |

Linking and referencing have been essential features of the ELM/KTT from its beginning. Table 2 lists and describes the classes of links already described or now being defined elsewhere.

TABLE 2

Basic ELM/KTT Link Classes

| | |
|---|---|
| 1. Narrative-to-Glossary Links (FIG. 2 510) | The most-commonly-used class of links, embedded invisibly in the narrative text or in a reference text. The ELM/KTT inserts glossary links in the text of a scene or unit using a massive script that recognizes the glossed term in its different forms in a text, and replaces the term shown in the text with a link to its glossary entry, preserving the term's appearance in the text. |
| 2. Glossary-to-Glossary Links (FIG. 2 520) | Terms within a glossary entry are themselves linked to other glossary entries. Such links appear and behave in the same way as narrative-to-glossary links, and are generated using the same type of large script. |
| 3. Scene-to-Scene (Unit-to-Unit) Links (FIG. 2 513) | These links lead a reader from one text unit, such as a scene, to another, in a meaningful narrative sequence. These links appear in any of a plurality of general forms, among them the 'Next/Previous' form, the point-of-view form, the character-present or theme-present form, and the keyword form. These forms of links are described in the text. |
| 4. External Links | The set of links that connect from within the ELM/KTT to points outside it. This class breaks down into author site links, ELM/KTT server site links, and ELM/KTT peer site links. Author links lead to an author's Website, where the reader can interact with Website content to purchase or access author-developed content. ELM/KTT server site links are the publisher's links made available for commercial service to readers for new ELM/KTT versions, updates and enhancements, and other content (for details of the commercial use and enhancement of the ELM/KTT, see the U.S. Patent application titled "Method And Apparatus For Electronic Literary Macrame Business Development", which is incorporated herein by reference. ELM/KTT peer site links allow limited sharing of ELM/KTT content between readers. |
| 5. Watermark Links | This is the set of links used to concatenate hidden scene presentations produced by the watermarking process. These links are of interest to readers who want access to otherwise-unavailable passages from the ELM/KTT. The watermark link sequence can be reached using a special link placed in the final scene of the ELM/KTT. (for the details of the ELM/KTT watermarking process, see the U.S. Patent application titled "Method And Apparatus For Digital Watermarking For The Electronic Literary Macrame", which is incorporated here by reference.) |
| 6. Linkless Links | Search engines offer a 'linkless' method of linking, which can be done by searching out occurrences of a term and selecting an occurrence based on a set of selection rules and a menu offered to a reader. Such a system eliminates many of the forms of linkage above, at the expense of ease of use and the risk of breaking the work's immersive hold on the reader. It can be implemented as a browser plug-in if considered necessary. |

Forms of Scene-to-Scene Links

See FIG. 2. Scene-to-scene links 513, also called unit-to-unit links, are described in the incorporated references, but are listed here for completeness to disclose their current forms. The first scene-to-scene link form is the 'Next/Previous' form, which is displayed as one of two isolated standard phrases at the foot of a scene or other text unit. The reader may select one of these two links to go forward or back in the main narrative line according to the narrative line selected and using other criteria established for the ELM/KTT. The actual unit to which this form of link takes the reader is dynamic, determined at link selection time. The 'Next/Previous' link form is also used in the reference articles to take the browsing reader from reference article to reference article.

A second scene-to-scene link form is the point-of-view form, which is displayed as the title of the scene or unit to which the link takes the reader, followed by the name of a character or narrator in the scene/unit with the word 'Viewpoint' or similar indicator. This form of link takes the reader to the next (or previous) scene/unit in which the named character is the point-of-view character.

A third scene-to-scene link form is the character-present form, which is like the second form with the word 'Present' or similar indicator. This form of link takes the reader to the next (or previous) scene/unit in which the named character or narrator is present in the scene/unit.

A fourth scene-to-scene link form is the keyword form, which presents a thematic indicator or phrase to the reader. This form of link takes the reader to the next (or previous) scene/unit, in a temporal or otherwise canonical sequence, for which one or more keywords associated with the scene/unit are applicable.

The present method and apparatus provide for definition and use of other similar forms of narrative scene/unit links as needed.

Building and Installing Initial Thread Links

Figure 3:
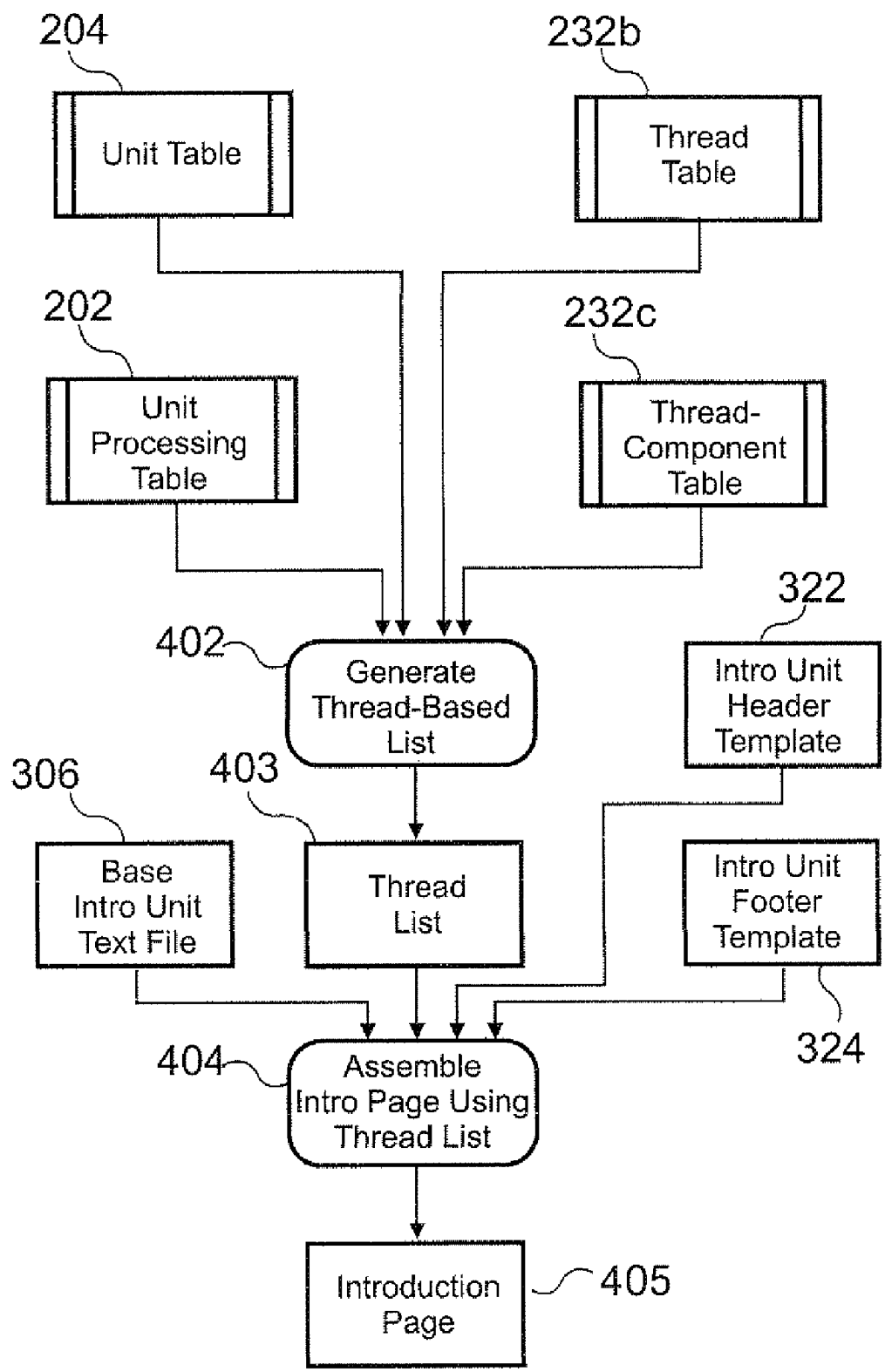
FIG. 3 shows the present method for building and installing initial thread links.
Figure 4:
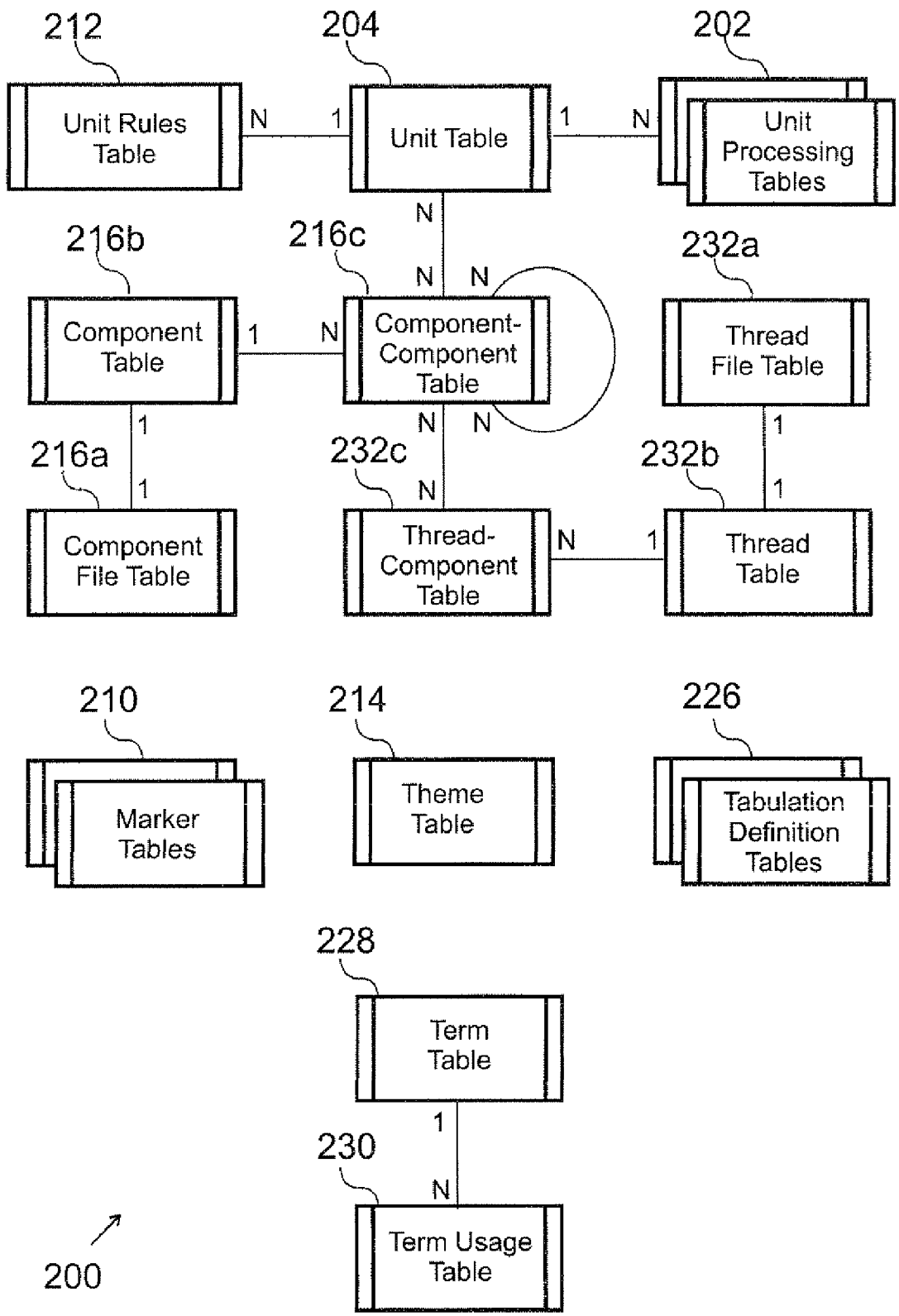
FIG. 4 shows the database structure and relationships for the present apparatus.

See FIG. 3. To generate initial thread links, the present method and apparatus use the unit tables (202, 204 of FIG. 4) and the thread tables (232a, b, c of FIG. 4) to construct (402) a single thread-based list 403 containing for each story or narrative thread a link to the first scene in the ELM/KTT for that thread, and a brief description of the thread. The present method and apparatus incorporate (404) said list into an ELM's or KTT's Introduction page 405 at compilation time using the ELM/KTT symbolic-include directive as stored in the base introduction unit text file 306, completing the page with the incorporation of introduction unit header template 322 and introduction unit footer template 324. A reader may choose a narrative thread to follow using the introduction page 405.

Building and Installing Initial Reference Links

Figure 5:
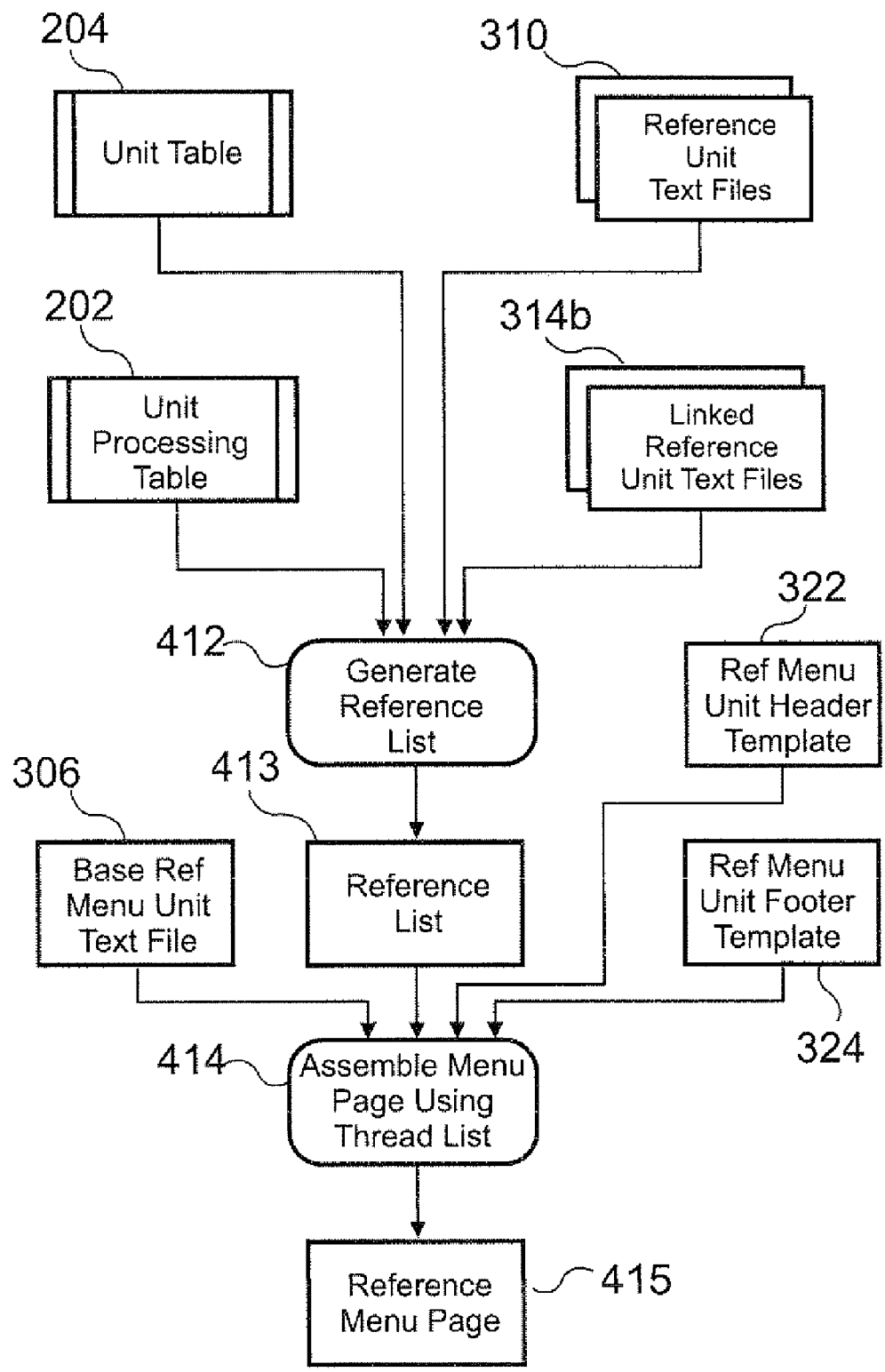
FIG. 5 shows the present method for building and installing initial reference links.
Figure 6:
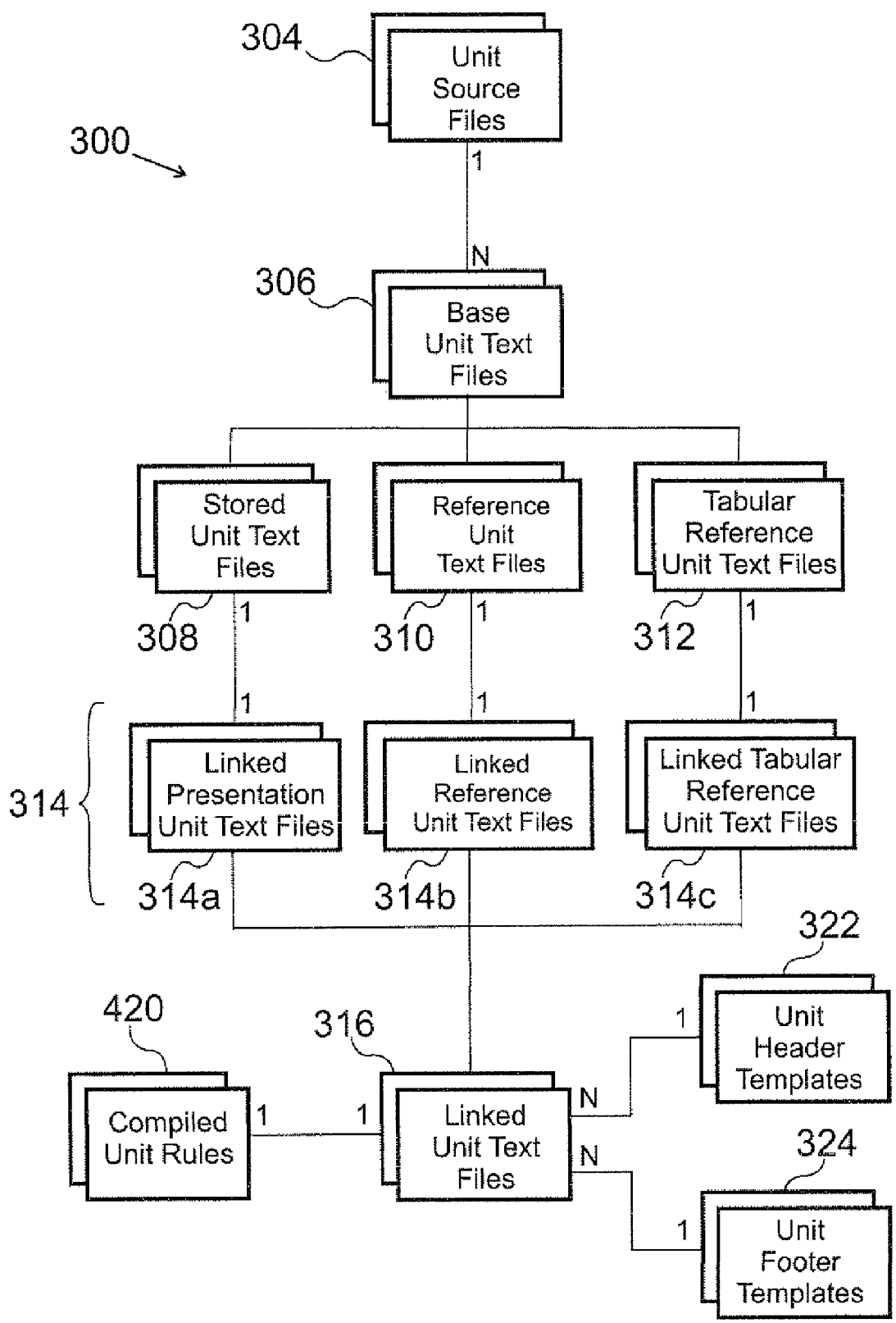
FIG. 6 shows the database structure and relationships for the textual information of the present method and apparatus.

See FIG. 5. To generate initial reference links, the present method and apparatus use the unit tables (202, 204 of FIG. 4) and optionally the reference files (310, 314b of FIG. 6) to construct (412) a single reference list 413 containing a link to each reference article together with a brief description of the article. The present method and apparatus use this link list with the symbolic-include feature to build a menu page to let browsing readers choose a reference article from the list. The present method and apparatus incorporate (414) said list into a reference menu page 415 at compilation time using the ELM/KTT symbolic-include directive as stored in the base reference menu unit text file 306, completing the page with the incorporation of reference menu unit header template 322 and reference menu unit footer template 324. A reader may choose a reference page to read using the reference menu page 415.

Building and Installing Scene (Unit) Starting Point Links

Figure 7:
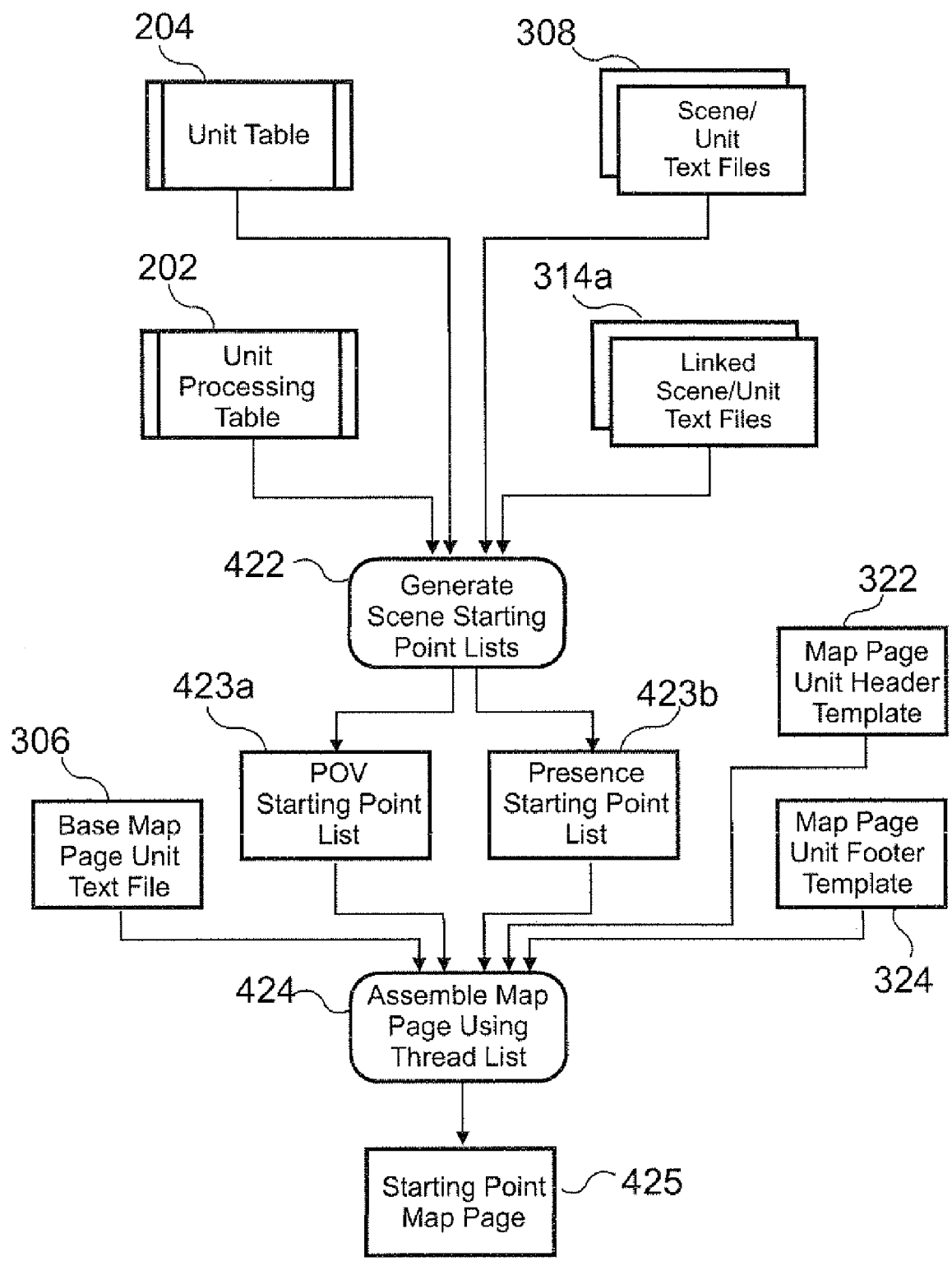
FIG. 7 shows the present method for building and installing scene (unit) starting point links.

See FIG. 7. To generate scene or unit starting point links, the present method and apparatus use the unit tables (202, 204 of FIG. 4) and the scene/unit files (308, 314a of FIG. 6) to construct (422) two starting point lists 423a, 423b. The first list 423a contains for each character or theme a link to the first scene or unit in the ELM/KTT in which that character or theme is the point of view for readers, together with the title of the scene or unit and an indication that the theme is the point of view for the reader. The second list 423b contains for each character or theme a link to the first scene or unit in the ELM/KTT in which that character or theme is present in some role, together with the title of the scene or unit and an indication that the character or theme is present in any role. The present method and apparatus use the symbolic-include feature with said lists 423a, 423b to build a "map" page 425 to let browsing readers choose entries to the narratives on the basis of the starting points of the narratives for each character or theme. The present method and apparatus incorporate (424) said list into a starting point map page 425 at compilation time using the ELM/KTT symbolic-include directive as stored in the base map page unit text file 306, completing the page with the incorporation of map page unit header template 322 and map page unit footer template 324. A reader may choose a narrative to read using the starting point map page 425.

Building and Installing Character (Theme) Starting Point Links

Figure 8:
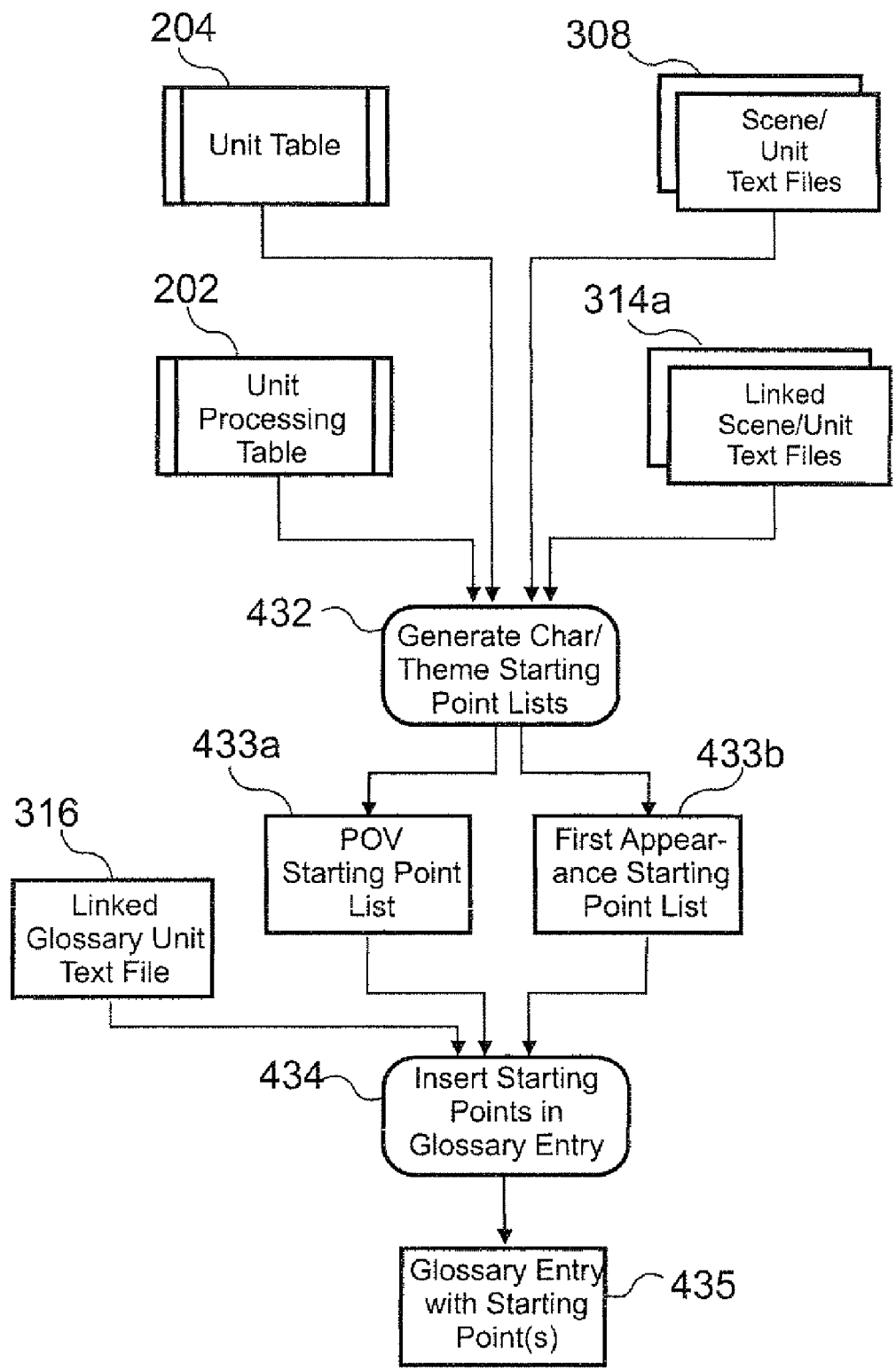
FIG. 8 shows the present method for building and installing character (theme) starting point links.

See FIG. 8. To generate character starting point links, the present method and apparatus use the unit tables (202, 204 of FIG. 4) and the scene/unit files (308, 314a of FIG. 6) to construct (432) two lists 433a, 433b, the first list point-of-view-based and the second list first-appearance-based, for every identified character or theme. The first list contains a link to the first scene in the ELM/KTT in which each character is point-of-view or the theme is central for readers. The second list contains for each character or theme a link to the first scene in which that character or theme is present in any role, if the character or theme appears before it is central for readers. The present method and apparatus place a link from each of said lists into the glossary entry for the corresponding character or theme. The present method and apparatus place the link inside a generated text passage to help a reader find a starting point for each glossary-identified character or theme in the ELM/KTT. The present method and apparatus incorporate (434) links from said lists into a character or theme glossary entry 435 at glossary compilation time using the ELM/KTT symbolic-include directive as stored in the linked glossary unit text file 316. A reader may choose a narrative to read using the character or theme glossary entry 435.

Building and Installing Contents Links

Figure 9:
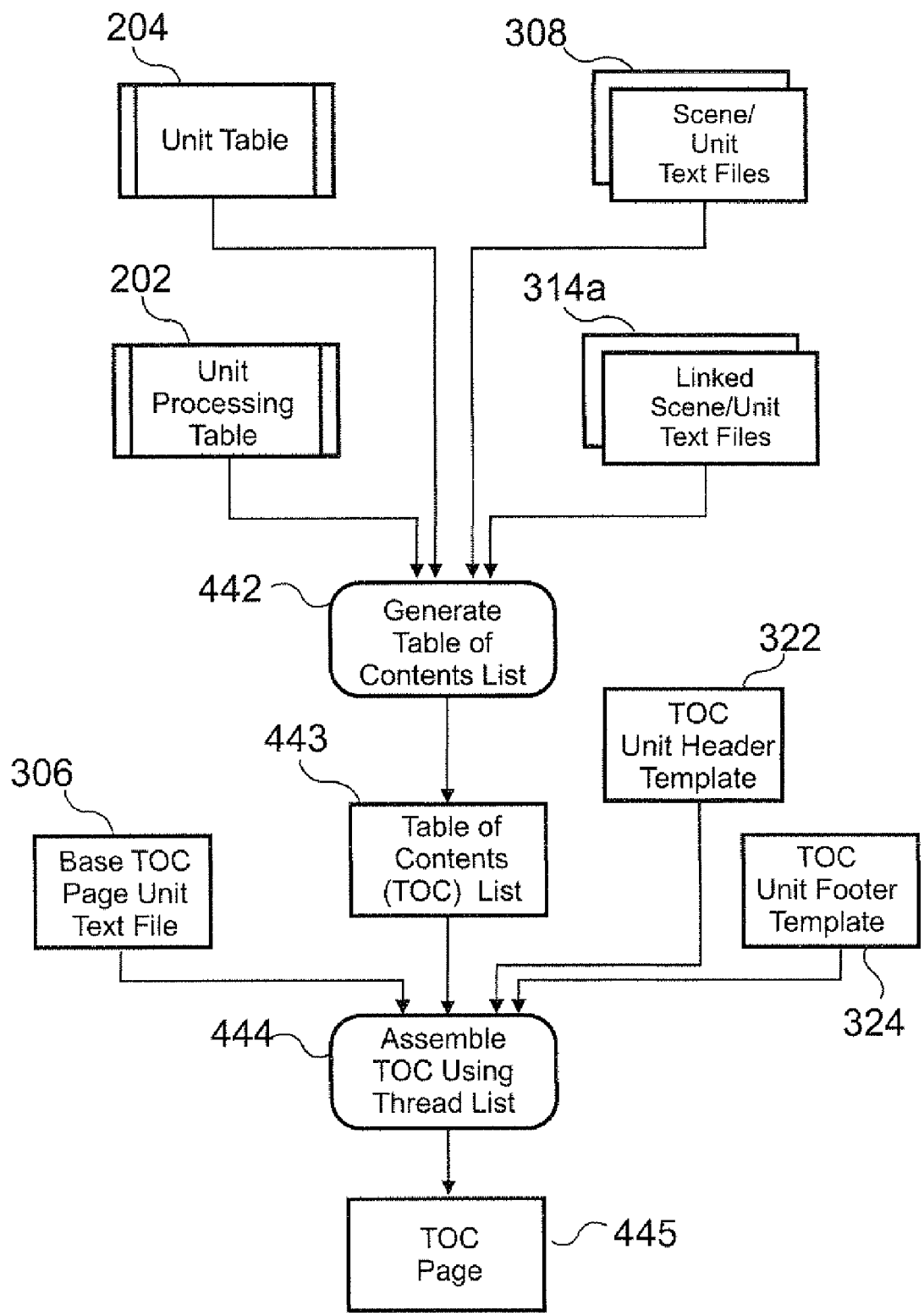
FIG. 9 shows the present method for building and installing contents links.

See FIG. 9. To generate complete contents links, the present method and apparatus use the scene/unit unit tables (202, 204 of FIG. 4) and the scene/unit files (308, 314a of FIG. 6) to construct (442) a single list 443 containing a link for every single scene or unit in the ELM/KTT, identified by name or title. The present method and apparatus incorporate (444) said list 443 into a table of contents (TOC) page 445 at compilation time using the ELM/KTT symbolic-include directive as stored in the base TOC unit text file 306, completing the page with the incorporation of TOC page unit header template 322 and TOC page unit footer template 324. A reader may choose a narrative to read using the starting point map page 445. The present method and apparatus offer browsing readers the choice of entries to the narratives either on the basis of the titles alone or on the basis of the titles as associated with browser linkmap zones, the latter comprising a type of geographical table of contents for the ELM/KTT.

Building and Installing Glossary-to-Reference Links

Figure 10:
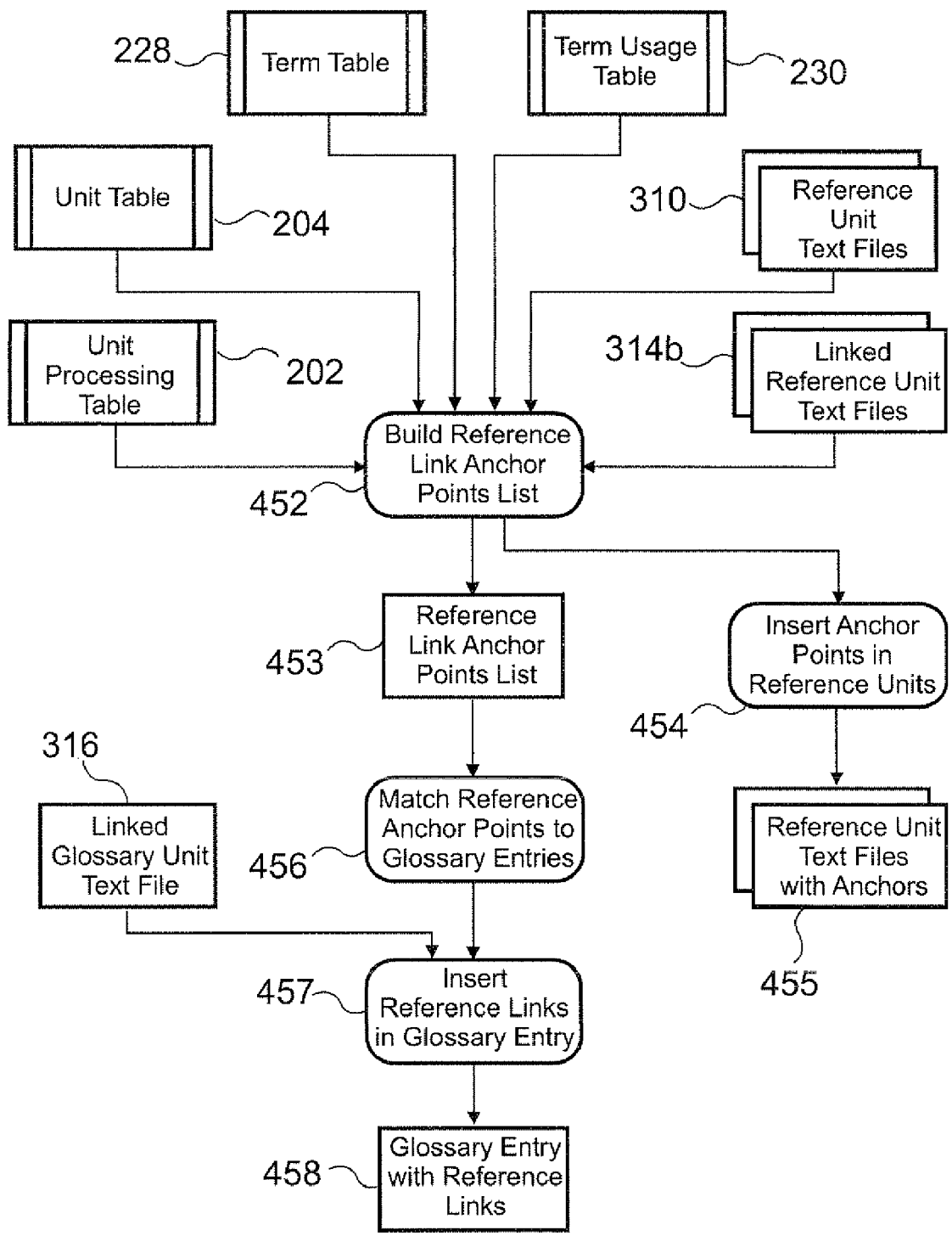
FIG. 10 shows the present method for building and installing glossary-to-reference links.

See FIG. 10. To generate glossary-to-reference links, the present method and apparatus use the unit tables (202, 204 of FIG. 4), the reference files (310, 314b of FIG. 6), and the term and term usage tables (228, 230 of FIG. 4) to construct (452) a list 453 of link anchor points based on the titles of the parts of the reference, install (454) each anchor point within each reference at the title location to produce updated reference pages 455, determine (456) whether or not a particular title matches a glossary term in the glossary 316, and when a match occurs, insert (457) a link from the matching glossary entry 456 to the link point in the reference 455 for the matching term, together with text for the reader to facilitate link use, producing an updated glossary entry 458 with reference links. An example of the text is "More information is found in the section titled XXX in the reference article titled YYY", where XXX identifies the section title of the reference, and YYY is the title of the reference.

Glossary Supplement Links Overview

The glossary supplement removes certain more-trivial entries from the glossary itself to reduce clutter for readers. Tabular data, when listed out entry by entry for presentation in the glossary, tend to produce a large number of glossary entries with routine data associated. Such entries may be useful to a reader seeking the meaning of a specific entry without doing a table lookup, but they get in the way of glossary readers who prefer to use the tables to find such data. Consequently, the glossary supplement of the present method and apparatus serves as a repository for tabular data and the explanations of such data in forms preferred by some readers, such as those who dislike scanning tables.

The glossary supplement links to the tables and other structures that generate it (see the paragraph titled "Structured-Information Management and Presentation" below.). The present method and apparatus include said tables and structures in its references using its symbolic-include feature, and incorporates in each such table and structure element a link back to the appropriate glossary supplement entry.

Different forms of terms and phrases require reference and linking to the same glossary entry. The present method and apparatus address the use of diverse forms for each term, so that the link-construction processes of the ELM/KTT covers the range of forms for each term.

Building and Installing Glossary Supplement-to-Reference Links

Figure 11:
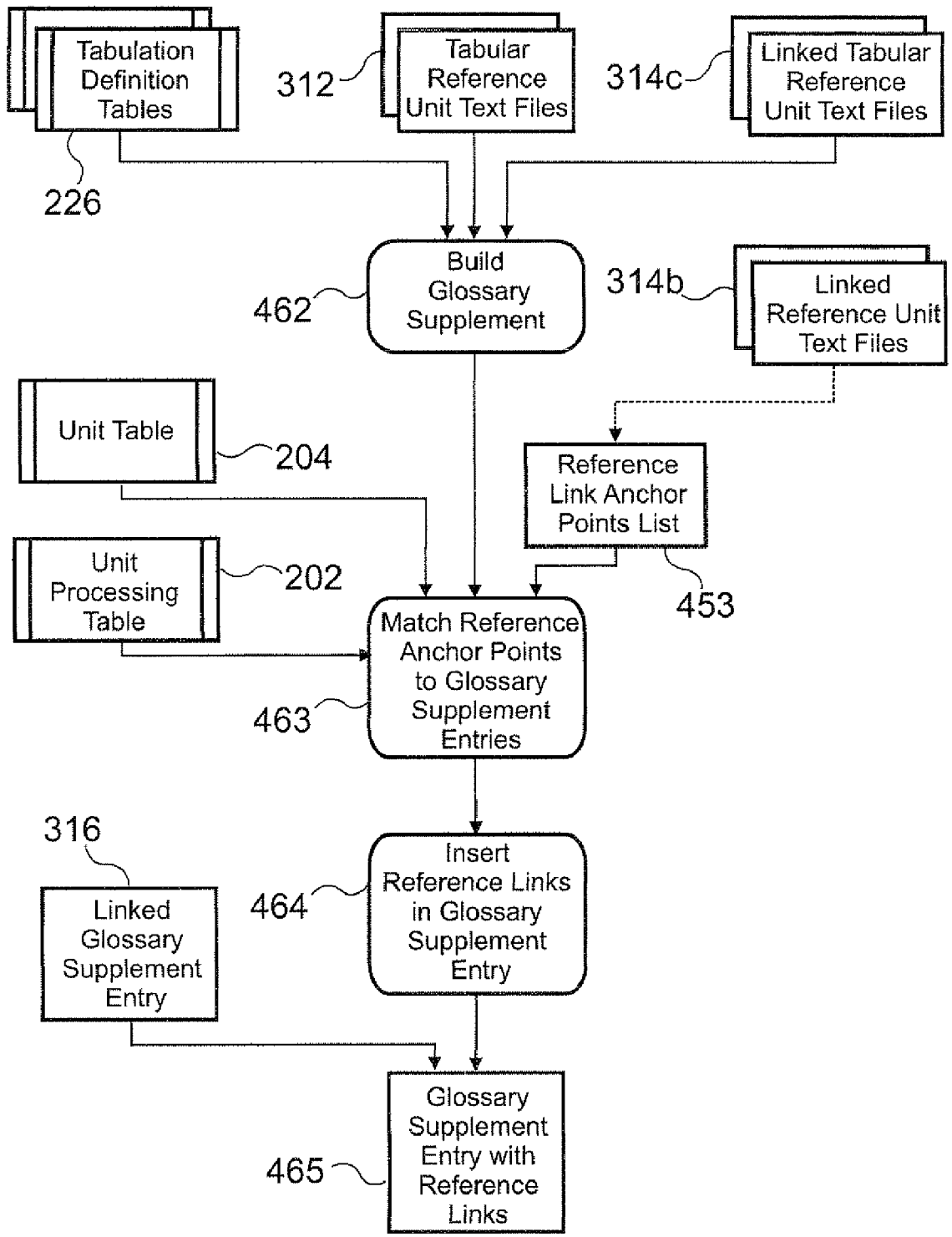
FIG. 11 shows the present method for building and installing glossary supplement-to-reference links.

See FIG. 11. To generate glossary supplement-to-reference links, the present method and apparatus use the unit tables (202, 204 of FIG. 4), the linked reference table (314b of FIG. 6), the reference link anchor point list 453, the tabular reference table (314c of FIG. 6) and the tabulation definition tables (226 of FIG. 4) to construct (462) the glossary supplement, determine (463) whether or not a particular reference link anchor matches a glossary supplement term, and when a match occurs, install (464) a link from the glossary supplement entry to the link point in the reference for the matching term, together with text for the reader to facilitate link use, producing an updated glossary entry 465 with reference links.

Building and Installing Reference-to-Glossary Supplement Links

Where tabulated terms in a reference generate both glossary and glossary supplement entries, the present method and apparatus provide for selection of either the link to the term's glossary entry or the link to the term's glossary supplement entry. At the time the present method and apparatus insert a reference's glossary and glossary supplement links, the present method and apparatus incorporate a pair of conventional event-processing requests in the reference's page. The present method and apparatus use, for example, the single-click selection event to initiate display of the glossary entry, and the double-click selection event to initiate display of the glossary supplement entry instead. With this feature, the reader can quickly and easily access either the glossary or the supplement for the term.

ELM/KTT Index Generation, Linking, and Use

The ELM and KTT presentation methods use the current glossary window to display either the glossary of terms or the glossary term index, as requested by the reader. The index contains the complete set of terms in the glossary, listed in their primary (anchor) form only. Following each term is a list of references, each reference a title for a scene or unit in which the term appears. An indexed term in a scene or unit may appear in any of the forms listed for it in the glossary. In the basic index embodiment, the displayed scene/unit title contains a link to the head of the scene, so that a reader can link from the glossary entry for a term to the index entry for that term, and then to any of the scenes/units in which the term appears in one or more of its glossed forms. Linking to a scene or unit from the index brings up that scene in the main (scene or unit) window, as for any scene.

The reader may link back from the index to the glossary by selecting the displayed name of the indexed term, which links to its corresponding glossary entry. Reciprocally, selecting the displayed name of the glossary term links to the corresponding index entry allows the reader to toggle back and forth between glossary and index without moving the mouse or other selection device.

A paragraph-level index embodiment for the index provides links to specific paragraphs or sections in scenes or units, in contrast to the links that lead only to the openings of the scenes/units. The paragraph-level embodiment addresses special needs for authors and readers needing links that focus more closely to the region of text in which the indexed term appears. The paragraph-level embodiment requires a manifold expansion of the index resulting from the generation of multiple links per scene and term used, and the inclusion of information to identify each indexed paragraph or section.

An expanded-index embodiment provides indexing for terms not stored in the glossary at all. In the expanded-index embodiment, the displayed scene titles and their associated links are presented in the index just as for terms appearing in the glossary. Selecting the displayed index entry name, however, returns the reader to the first entry in the glossary section containing terms with the same initial letter as the index entry selected.

In an expanded-scope embodiment, the present method and apparatus process both scene text files and reference text files to develop its list of indexed references for each term indexed. All embodiments may be combined as desired to accomplish any combination of the objectives of the present method and apparatus.

Building and Installing an ELM/KTT Index

Figure 12:
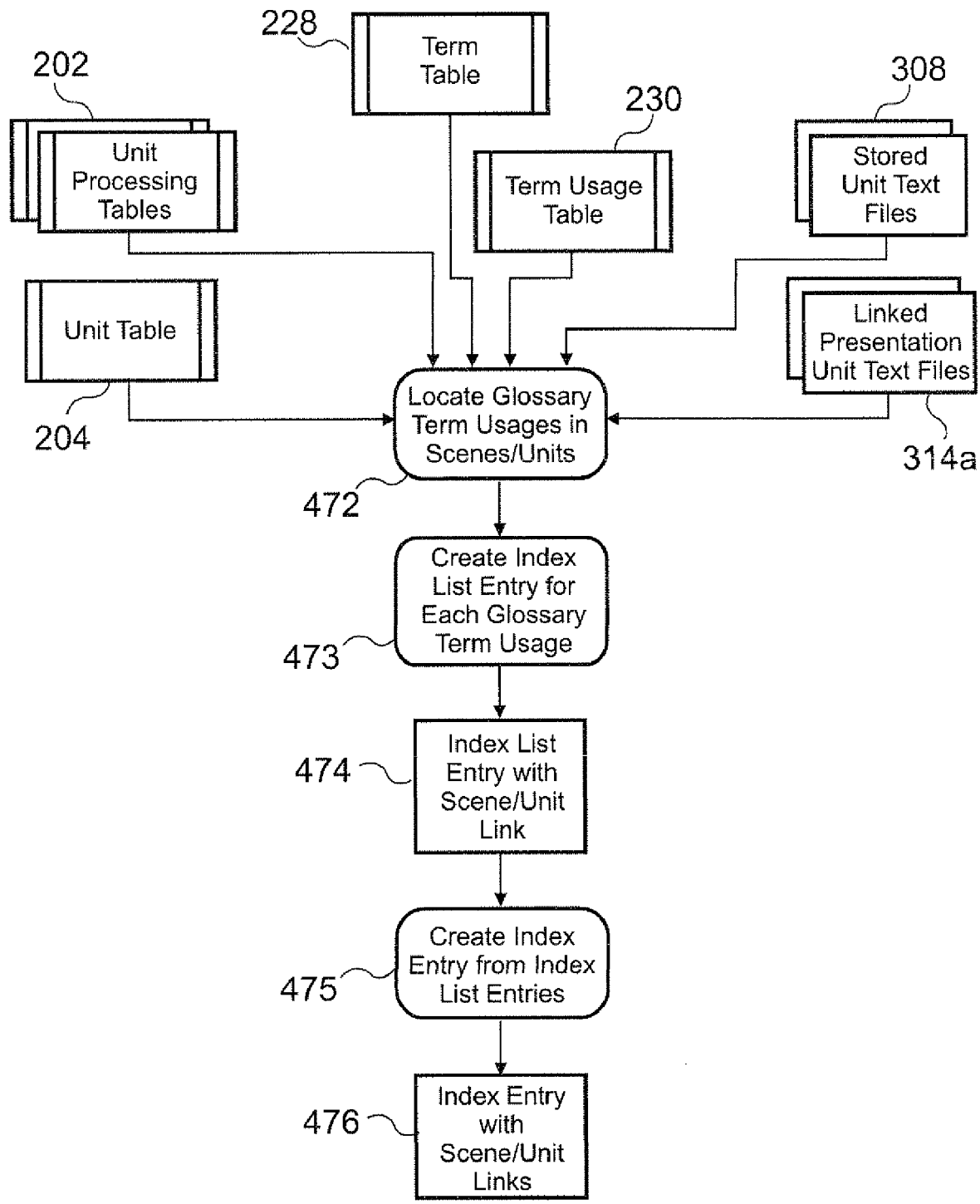
FIG. 12 shows the present method for building and installing and ELM/KTT index in a basic indexing embodiment.

See FIG. 12. In its basic indexing embodiment, the present method and apparatus use the unit tables (202, 204 of FIG. 4), the term and term usage tables (228, 230 of FIG. 4), and the scene/unit files (308, 314*a* of FIG. 6) to locate (472) the first occurrence of each glossary term from the glossary in each scene/unit file 314*a*. For each occurrence, the present method and apparatus create (473) an index list entry 474 containing the glossary term, the scene/unit title where the term was found, and the link anchor of the scene/unit file 314*a*. From each index list entry 474, the present method and apparatus build (475) an index entry 476, linking each indexed term to the same term's definition in the glossary, and listing in each index entry 476 the indexed term and, for each scene/unit file 314*a* in which the term was found, the scene/unit title and the link anchor of the scene/unit file 314*a*.

Figure 13:
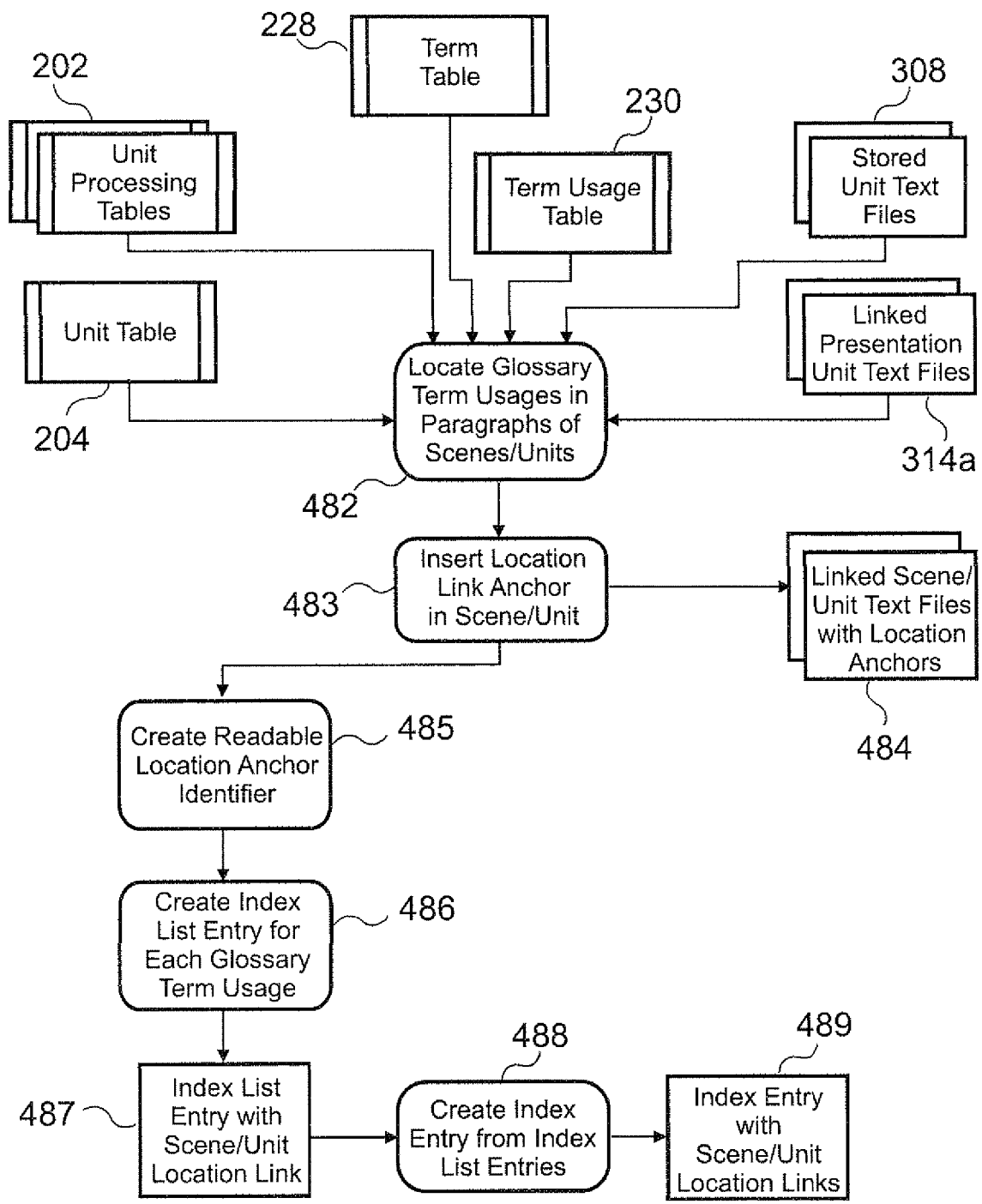
FIG. 13 shows the present method for building and installing and ELM/KTT index in a paragraph-level indexing embodiment.

See FIG. 13. In its paragraph-level indexing embodiment, the present method and apparatus use the unit tables (202, 204 of FIG. 4), the term and term usage tables (228, 230 of FIG. 4), and the scene/unit files (308, 314*a* of FIG. 6) to locate (482) the first occurrence of each glossary term from the glossary in each section or paragraph of each scene/unit file 314*a*. For each occurrence matched in a paragraph/section of a scene/unit file 314*a*, the present method and apparatus insert (483) at the start of said paragraph or section of said scene/unit file 314*a* a location link anchor to be used in the index entry, creating scene/unit text files with location anchors 484, and creates (485) a readable location identifier for the link anchor's paragraph or section. The present method and apparatus further create (486) an index list entry 487 containing the glossary term, the scene/unit title where the term was found, the location identifier for the link anchor's paragraph or section, and the link anchor of the scene/unit. From each index list entry 487, the present method and apparatus build (488) an index entry 489, linking each indexed term to the same term's definition in the glossary, and listing in each index entry 489 the indexed term along with the scene/unit title, location identifier, and link anchor of each scene/unit file 484 in which the term was found.

Building and Installing Glossary-to-Index and Index-to-Glossary Links

The present method and apparatus present each glossary term as a link to the corresponding index entry, so that a reader can navigate directly from the glossary term to the index and its list of scenes or units containing an occurrence of said term. Conversely, the present method and apparatus present each index term as a link to the corresponding glossary entry, so that a reader can navigate directly from the index term to the glossary and its definition of said term.

Symbolic Links and Symbolic Anchors

When a written work is prepared for presentation in electronic form, the preparer, who is usually an author or an editor, must decide how and where the work's parts are to be interconnected for the reader's use. The ELM/KTT is a process and a product which give preparers and readers a much-expanded range of possible ways to link and experience a narrative written work.

During compilation of a work, the ELM/KTT processes texts in detailed form, removing earlier HTML links and replacing them with new ones as the linked and linking texts undergo changes in the writing. HTML commands can be preserved through the compilation process for texts which previously contained HTML, but there is no such preservation for HTML originating in a word-processor file. The present method and apparatus provide exactly such a capability, and exploits said capability to provide support for related types of directives as well.

To support the capability, the present method and apparatus set up and maintains a pair of files: a symbolic-anchor file containing the names and filenames of all the symbolic anchor points an author creates for an ELM/KTT, and a symbolic-link file containing the names, filenames, and symbolic-anchor names for all the symbolic links the author creates for the same ELM or KTT. Both symbolic-anchor names and symbolic-link names are unique across the entire ELM/KTT.

Figure 14:
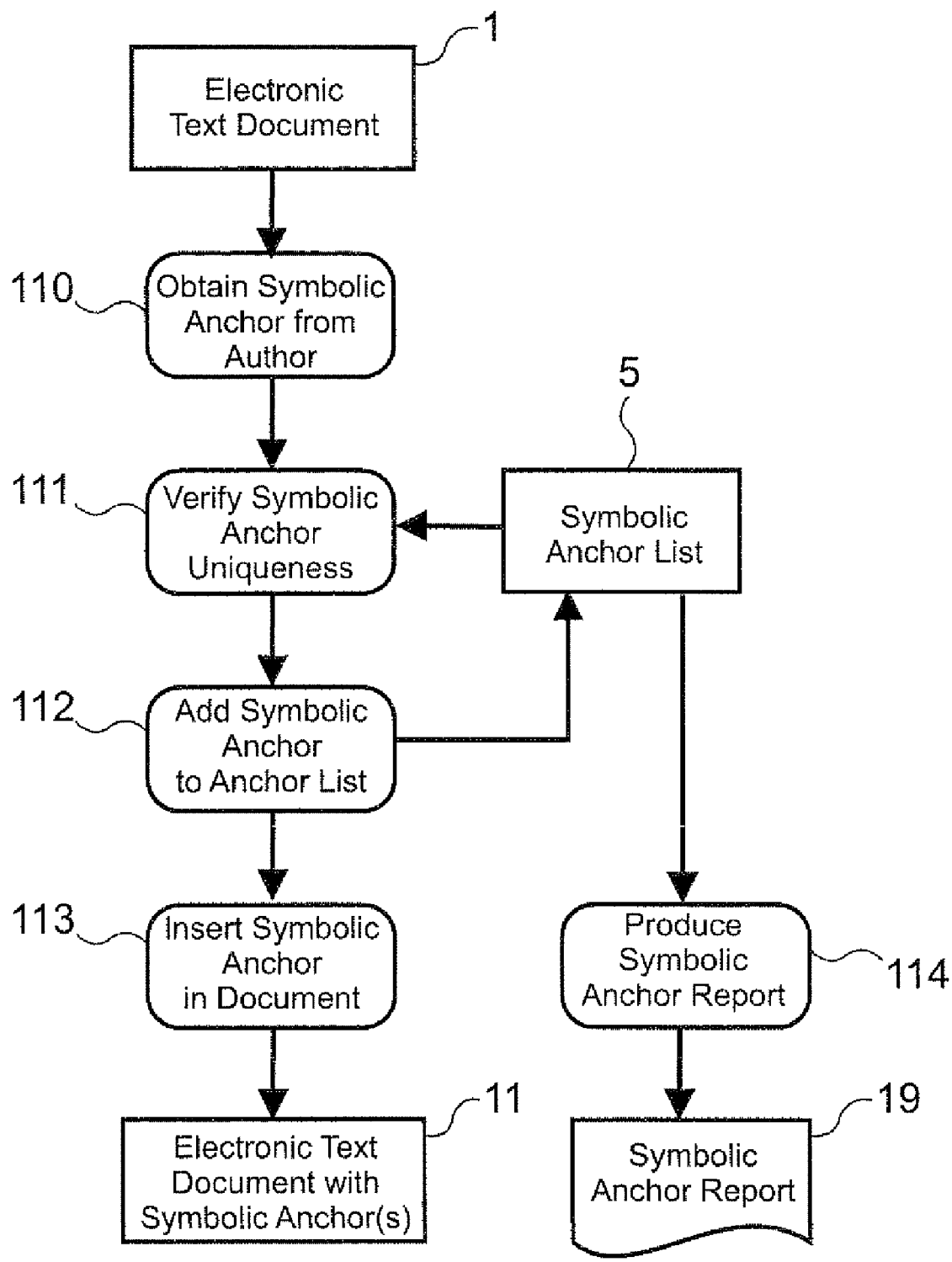
FIG. 14 shows the present method for building and installing symbolic anchors.

See FIG. 14. An author or other user of the present method and apparatus locates a point in an electronic text document 1 where a hypertext anchor is needed, so that a link elsewhere in the narrative may take the reader directly to the anchor point. The author positions the text pointer (cursor) and requests a form display. The author enters on the form a symbolic name for the anchor, an internal identifier for the anchor, and a target window type for the window in which the document containing the anchor is to be displayed. The present method and apparatus confirm the entry as unique (111) by insuring that its internal identifier is not already stored in a symbolic-anchor file, and closes the form. The present method and apparatus insert (113) the symbolic anchor in the text in a visible form (e.g., [Symbolic Anchor:anchor_id:anchor_name:display_text]) and adds (112) the symbolic name, the internal identifier, the target window type, and the file containing said symbolic name to the ELM's or KTT's symbolic-anchor file list 5 of such names. The resulting electronic document 11 contains one or more symbolic anchors.

Figure 15:
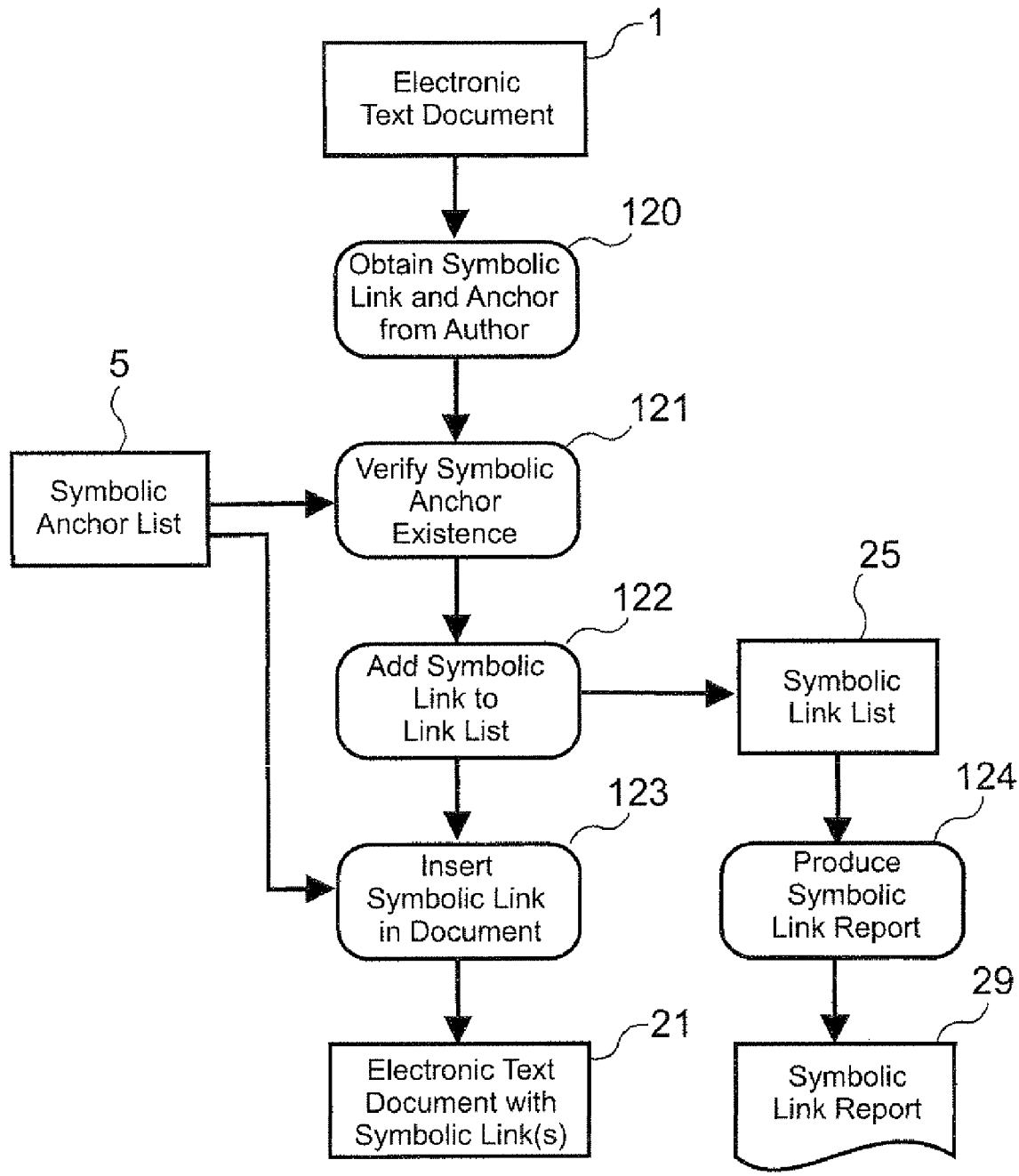
FIG. 15 shows the present method for building and installing symbolic links.

See FIG. 15. For linking to an anchor, the author locates a point in an electronic text document 1 where a hypertext link is needed to let the reader transfer to a symbolic anchor point. The author positions the text pointer (cursor) to highlight the word representing the link point and requests a form display. The present method and apparatus retrieve all symbolic anchor names and their associated data from the anchor list 5 and presents them in said form. The author selects or enters the symbolic name for the anchor point, and the present method and apparatus verify (121) the anchor point's validity. The author then enters a symbolic name for the link itself, confirms the selection and entry, and closes the form. The present method and apparatus insert (123) the symbolic link in the text in a visible form (e.g., [Symbolic Link:link_id:display_text:anchor_file:anchor_name:window_target]), incorporating the highlighted word representing the link point, the symbolic anchor name, the symbolic anchor's file name, and the symbolic anchor's target window type as retrieved from symbolic-anchor file list 5. The present method and apparatus then add (122) the symbolic link name, the file containing said symbolic link name, and the symbolic anchor name to the symbolic-link file list 25 of such names. Note that electronic text documents may contain both symbolic anchors and symbolic links.

Symbolic Inclusion of Files

The incorporation of generated links and generated lists of links into the outputs of the present method and apparatus as described above is supported by the file inclusion feature of the present method and apparatus. See FIG. 16. An author or other user of the present method and apparatus locates a point in an electronic text document 1 where the contents of a separate file is needed, so that the contents of said separate file may be inserted in electronic text document 1 at a later stage in the construction of the ELM/KTT output. The author positions the text pointer (cursor) and requests a form display. The author enters on the form a pathname for the file to be included and the filename of the file to be included (130). The present method and apparatus validate the filename and attributes of the file to be included (step not shown), adds (132) the file inclusion directive to a file inclusion list 35, and inserts (133) the include directive in the text in a visible form (e.g., [Include File:path_and_file_name]). The resulting electronic document 31 contains one or more file-inclusion directives.

In extended embodiments, the present method and apparatus create, propagate, and convert symbolic references to additional hypertext features (e.g., HTML or XML features) to support an author's use of such features in an electronic text document without knowledge of the detailed coding requirements of said features, analogously to the method hereinabove described. In this way the present method and apparatus support the author's incorporation of image files, tables, and other hypertext features in a symbolic form to be resolved when all author-entered symbolic components are resolved into hypertext components as described hereinabove.

The present method and apparatus give the inserted symbolic anchors and links and the inclusion directives a distinctive form to mark them for later processing during ELM/KTT compilation. Each symbolic anchor or link is preceded by an escape sequence of one or more delimiting characters (the left mark, e.g., '[' here) and followed by an escape sequence of one or more delimiting characters collectively distinct from those in the left mark (the right mark, e.g., ']' here).

Figure 17:
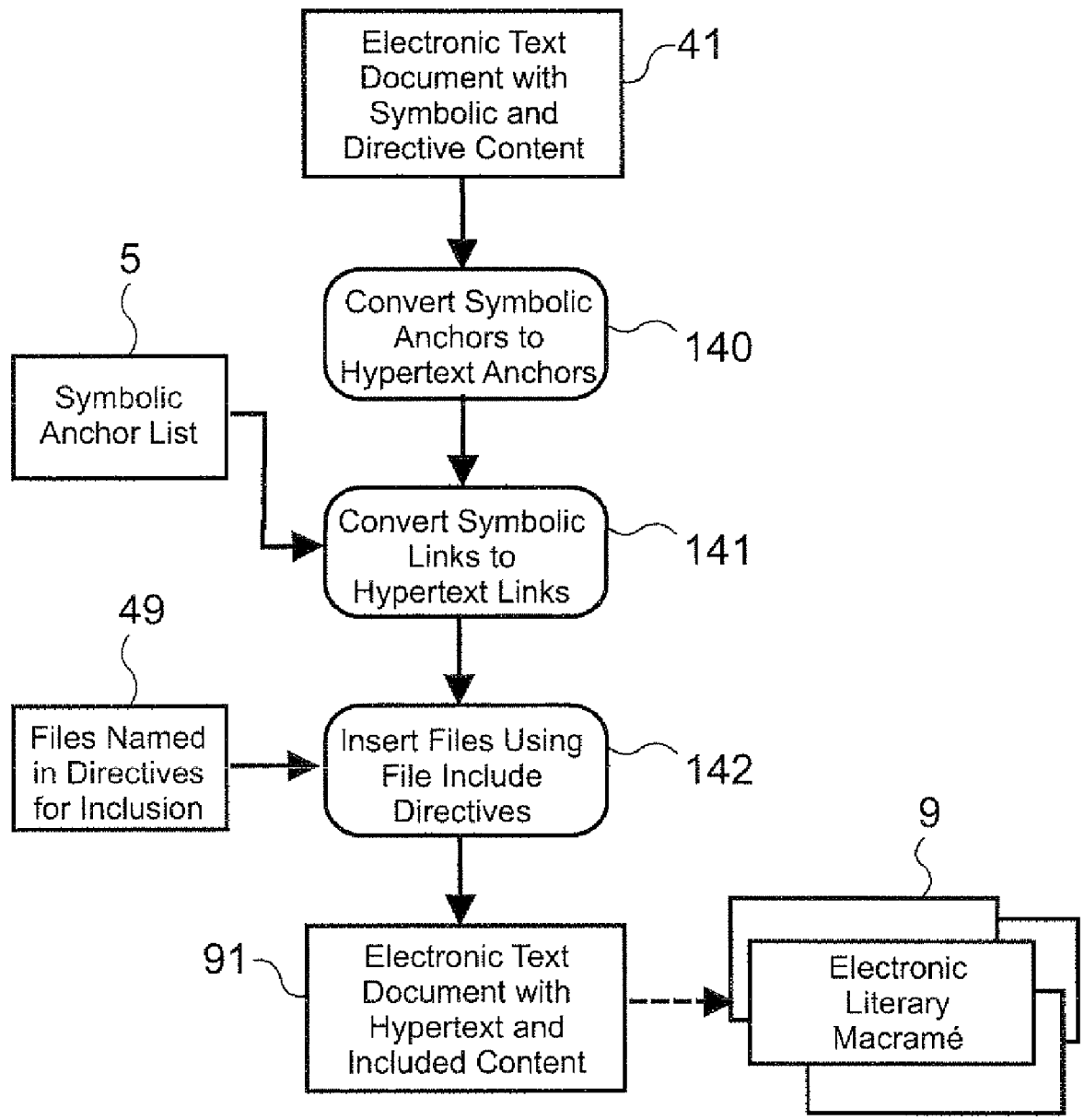
FIG. 17 shows the present method for converting symbolic anchors and links to hypertext anchors and links respectively, and for including files based on file inclusion directives.

As shown in FIG. 17, during compilation of the ELM/KTT the present method and apparatus convert (140, 141) the symbolic links and anchors in electronic text documents 41 to HTML links and anchors respectively, inserting additional formatting and processing parameters in the HTML code for the links and anchors as the ELM/KTT may require. The present method and apparatus also insert (142) any files for which file inclusion directives were present in the input document. This process produces electronic text documents 91 containing hypertext links, hypertext anchors, and included files.

Through later ELM/KTT processing, electronic text documents 91 become components of the ELM/KTT output. The present method and apparatus make the resulting converted links identifiably distinct from the links inserted in the basic ELM/KTT processing, in order to preserve the converted links during glossary and reference link rebuilding.

Figure 16:
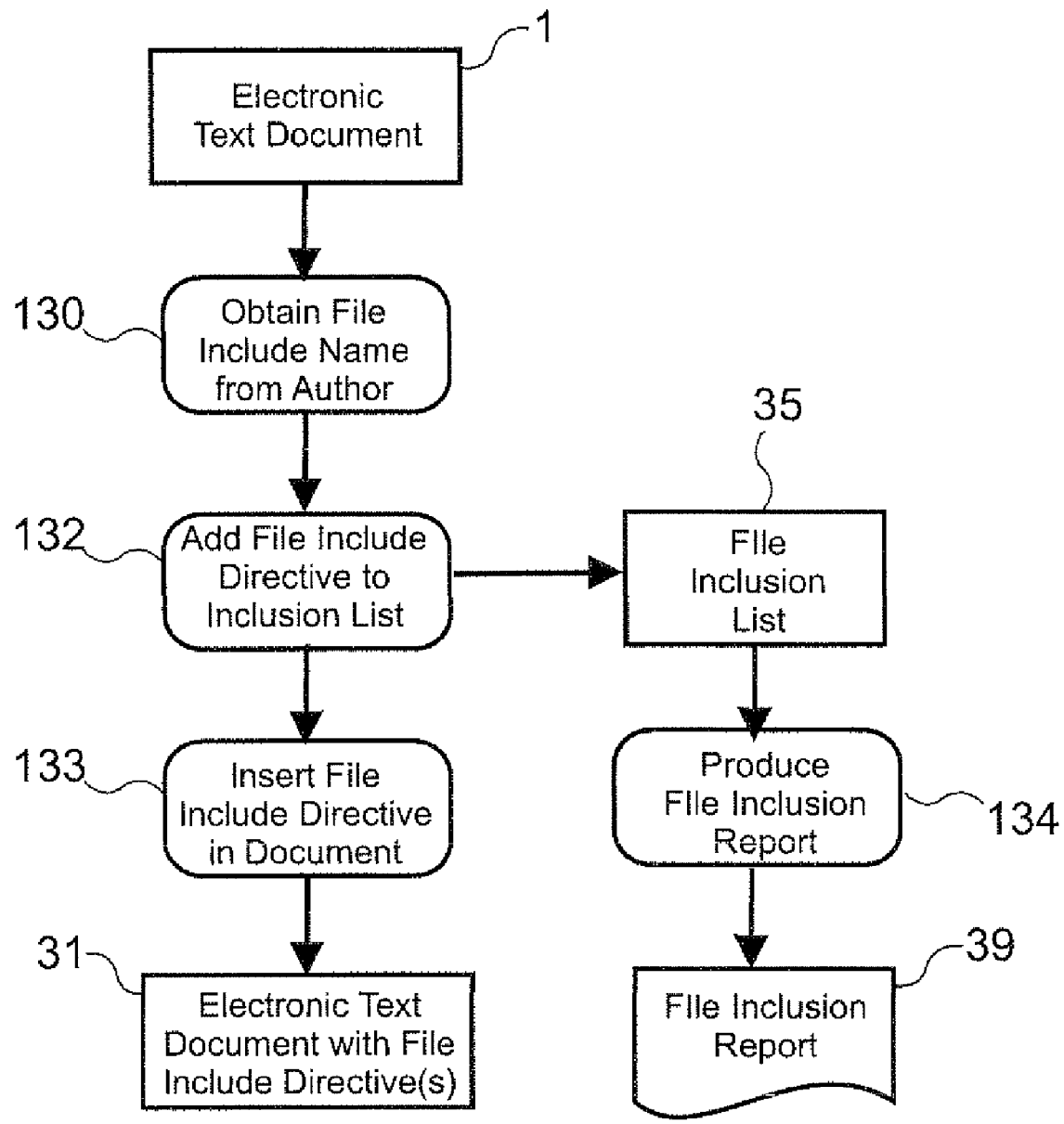
FIG. 16 shows the inputs, processing, and outputs for symbolic file inclusion directives.

As shown in FIGS. 14, 15, and 16, the present method and apparatus use the symbolic-anchor file list 5, the symbolic-link file list 25, and the file inclusion list 35 to provide the author or editor with reports, respectively 19, 29, and 39, containing all the symbolic components and file inclusion directives which were manually installed by the author or editor. The present method and apparatus govern symbolic links in their appearance by separate stylesheet specifications.

Through the present method and apparatus, the ELM/KTT combines automated linking with author-defined manual linking in such a way as to avoid interference between the two processes by which links are implemented in the ELM/KTT for use by readers. In this way an author or editor can produce literary, rhetorical, or pedagogical effects not easily accomplished using conventional means.

Sets, Relationships, and Structured Information

A written narrative, whether literary or academic, engenders an environment or context in the mind of its reader. This context comprises a kind of conceptual or imagined 'space' in which events and entities interact. For the reader, such a space forms an inner reality in which the reader becomes, and stays, immersed. One principle authors try to follow is that of enrichment of the attributes of the inner reality without sacrificing narrative momentum and reader attention. The ELM/KTT offers unique support for such enrichment.

The ELM/KTT provides an author with methods for organizing the entities and elements of a narrative's conceptual or imagined space. Set membership, hierarchies of sets, family relationships, social groupings, rankings, even functional relationships definable as maps from one collection or set to another, all belong in a writer's conceptual space for a piece. Authors usually draw upon such organization in a piecemeal fashion, using members of a set to sketch the set's existence and generate a credible realm in which the narrative is situated.

A consequence of such piecemeal usage may be a certain thinness to the inner reality of the narrative. A browsing reader, immersing herself or himself more and more deeply in the world of the narrative, uncovers unanswered questions about the relationships and aggregates of things in the narrative's world. The present method and apparatus support both an author's construction of fuller sets of relationships and entities, and a reader's ability to engage with those sets to recreate individually the vivid reality of the author's generated realm.

The fields of database design and artificial intelligence supply many conventional methods of codifying relationships for computational use in automated reasoning. The present method and apparatus orchestrate the use of such conventional methods to give readers of a narrative some useful connections among the entities and processes an author develops, helping authors to integrate these entities and processes smoothly and easily into an ELM or KTT.

The following classes of structure exemplify the types of relationships to be defined:
lists of entities that are members of a class in a many-to-one relationship, such as days of the week, or months of the year;
members of a class in a many-to-many relationship, such as languages spoken in a province where a language may be spoken in many provinces;
hierarchies of lists of entities, such as subclasses of subclasses of a class of vehicles; and sequences of theorems or definitions used in the proof of a mathematical proposition.

The glossary of the ELM/KTT itself is a form of list, with each entry in the glossary having many instances of the entry's use linked back to it. The enhanced indexing capability of the present method and apparatus, defined hereinabove as leading back from a glossary entry to all the instances of a term's use, comprises an inverse relationship vis-á-vis the glossary itself.

Elements of the narrative that contribute directly to a reader's sense of verisimilitude and immersion are of intense interest to readers of an ELM or KTT, much more so than for readers of a traditional, linear narrative. For example, an author who names a single day of the week in a created world suggests by that naming that the other days have other names, but doesn't want to interrupt the flow of the narrative to list them all. On the other hand, when that one day is named in the narrative, the reader may not remember how it relates to the other days of the week. The present method and apparatus augment the ELM/KTT glossary with links that immediately offer the reader some assistance as needed.

While browsing the created realm of an ELM or KTT, readers often want to delve into relationships among the entities of that realm as they read. For example, if the author mentions a musical instrument of a particular type, a reader might want to know about other instruments. The same is true of colors, languages, foods, and other organizations of elements.

The situation becomes more complex with familial relationships. Authors sometimes include genealogies as appendices in printed works. An ELM or KTT can incorporate genealogical relationships in a navigable form, so that a reader can locate siblings, parents, children, spouses, collateral relatives, ancestors, and descendants of a character whose place in the author's realm is made more vivid by such connections.

The ELM/KTT relies on the author to provide all tabular information along with some specifications of relationships, but provides means for converting the tables and text into readable components for the readers of the ELM/KTT output.

In the early stages of the development of a particular ELM or KTT, the author may only provide a few lists or tables of information. The dynamic character of the ELM/KTT, in which growth and change of its content and structure are essential parts, allows the repeated addition, refinement, and extension of the sets and relationships of the work. Each such added component serves as an attractant to the reader who wishes for more information from the world of the ELM or KTT. Attracted readers in turn provide commercial opportunity for the author and the publisher. This aspect of the ELM/KTT is further developed in the patent application titled "Method And Apparatus For Electronic Literary Macramé Business Development", referenced hereinabove.

Structured-Information Management and Presentation

To address the needs for handling structured data in the ELM/KTT for readers and authors, a structured-information-handling embodiment of the present method and apparatus using tabulation methods is presented. Other embodiments produce similar output results. The method of the ELM/KTT described herein suppresses information overloads for the reader, and spells out in text form some kinds of structured information for readers preferring a narrative approach to that information. The described embodiment is presented simply as an illustration and instance of the class of such table-handling methods, and should not be considered as restricting the present method and apparatus to any limitations implied by the illustration.

Templates for standard sentences and phrases are useful in developing presentations, in text form, of elements and components of table content. The contents of any given table entry can then be presented to readers as narrative, which some readers find much easier to assimilate than tabular information. The present method provides for presentation of both the table itself as HTML and the narrative content of the table in glossary-entry format.

To avoid cluttering the glossary itself with table content narratives, the supplement to the glossary of the present method and apparatus contains just the template-derived texts representing and elaborating table entries. To reach the supplement, links are provided in the glossary itself. Each supplement entry then links to the generating table, if it exists, in the document containing the table.

Tabular entries may be fairly ordinary terms and phrases which have their special meaning only in certain contexts in the scenes or the reference documents. In order to avoid creating links from irrelevant scene or reference content, there are no links to the glossary supplement directly from the scenes or the reference documents.

Tables in the ELM/KTT generally take one of three forms: a simple list of items, such as names of days of the week; a list with data associations, such as the names of military units and their constituent units; and a two-dimensional table, such as the names of andro colors and their octaves of wavelength. Other forms are provided as needed. The three listed here exemplify the approach used.

Defining a table for the ELM/KTT uses a file in the following general form:

```
[TABLE]|<text-table-name>|<table-width>|<table-alignment>|<table-margin>|<table-
class>|<table-reference-file-name>|<table-build-option>|
[TABLEHDR]|<table-header-text>|<table-definition-text|
[COLUMNTTL]|<column-1-title-1>|<column-2-title-1>|...|<column-J-title-1>|
...
[COLUMNTTL]|<column-1-title-K>|<column-2-title-K>|...|<column-J-title-K>|
[COLUMNHDR]|<column-title-1-name>|<column-title-1-definition>|
...
[COLUMNHDR]|<column-title-K-name>|<column-title-K-definition>|
[COLUMNDATA]|<column-1-data-type>|<column-2-data-type>|...|<column-J-data-type>|
[COLUMNTYPE]|<column-1-content-type>|<column-2-content-type>|...|<column-J-content-
type>|
[ROWHDR]|<column-1-title-1>|<row-header-1-definition-text>|
[ROWHDR]|<column-2-title-1>|<row-header-2-definition-text>|
...
[ROW]|<row-1-column-1-data>|<row-1-column-2-data>|...|<row-1-column-J-data>|
...
[ROW]|<row-I-column-1-data>|<row-I-column-2-data>|...|<row-I-column-J-data>|
[TEMPLATE]|text...{<column-A1-title-B1>}...{<column-A2-title-B2>}...text|
...
[TEMPLATE]|text...{Table Title}...{Table Link}...text|
```

HTML table definitions are not used because HTML offers little to assist the table-builder to identify relationships among the table's rows, columns, and their contents. The above type of file allows us to exploit the relationships of meaning to build useful narrative explanations for each table entry, a feature which many readers appreciate when facing the task of skimming through tabular data to find the term they want.

Following are the explanations for the table definition statements.

The [TABLE] Definition Statement

This statement defines the general characteristics of the table itself. The fields of this statement, separated by '|' and ending with a '|', are as follows:

| | |
|---|---|
| <text-table-name> | the name of the table itself, alphanumeric with no spaces |
| <table-width> | the table width as specified for HTML |
| <table-alignment> | the alignment of the table on the Web page, as for HTML |
| <table-margin> | the HTML margin specification for the table |
| <table-class> | the CSS stylesheet for the table |
| <table-reference-file-name> | the name of the file containing the table |
| <table-build-option> | the word 'yes' if the table is to be constructed as an HTML table for storage and presentation, with any other value omitting the generation of the HTML table. |

The [TABLEHDR] Definition Statement

This statement defines the header for the table. The fields of this statement, separated by '|' and ending with a '|', are as follows:

| | |
|---|---|
| <table-header-text> | the text to appear in enhanced form as the title of the table |
| <table-definition-text> | a text describing the table and its contents |

The [COLUMNTTL] Definition Statement

This statement defines the title to be used for each column of the table. There may be several column title definitions, each requiring a row of the table to display. The fields of this statement, separated by '|' and ending with a '|', are as follows. The 'X', for the column, and 'Y', for the title row, are shown here for descriptive reasons, and are not a part of the title:

| | |
|---|---|
| <column-1-title-1> | the first title for column 1. |
| <column-2-title-1> | the first title for column 2. |
| ... | |
| <column-X-title-1> | the first title for column X |
| ... | |
| <column-1-title-Y> | the Yth title for column 1 |
| <column-2-title-Y> | the Yth title for column 2 |
| ... | |
| <column-X-title-Y> | the Yth title for column X |

The [COLUMNHDR] Definition Statement

This statement defines the characteristics of each column title row. There is one COLUMNHDR statement for each COLUMNTTL statement. The fields of the COLUMNHDR statement, separated by '|' and ending with a '|', are as follows:

| | |
|---|---|
| <column-title-1-name> | the name of the first column title row |
| <column-title-1-definition> | a text describing the contents of the first column title row |
| ... | |
| <column-title-Y-name> | the name of the Yth column title row |
| <column-title-Y-definition> | a text describing the contents of the Yth column title row |

The [COLUMNDATA] Definition Statement

This statement identifies the type of content for each column. Some tables present the same type of information in multiple columns, while others present different content in each column. There is only one [COLUMNDATA] statement per table. The terms found in this statement. The fields of this statement, separated by '|' and ending with a '|', are as follows:

| | |
|---|---|
| <column-1-data-type> | a name or phrase for the kind of content in the first column |
| ... | |
| <column-X-data-type> | a name or phrase for the kind of content in the Xth column |

The [COLUMNTYPE] Definition Statement

This statement defines the usage of the column content. Some columns contain entries for which narrative statements are constructed, while others contain only values associated with such entries. There is only one [COLUMNTYPE] statement per table. The fields of this statement, separated by '|' and ending with a '|', are as follows:

| | |
|---|---|
| <column-1-content-type> | if column 1 contains only data to be associated with the narrative generated from another column, the word 'data' appears here. Otherwise empty. |
| ... | |
| <column-X-content-type> | if column 1 contains only data to be associated with the narrative generated from another column, the word 'data' appears here. Otherwise empty. |

The [ROWHDR] Definition Statement

This statement defines the presence and meaning of a row header, or an entry that serves to identify the row of the table to a reader. More than one column may be used as a row header. The fields of this statement, separated by '|' and ending with a '|', are as follows:

| | |
|---|---|
| <column-1-title-1> | the title of a first column in which the row header appears |
| <row-header-1-definition-text> | text describing the first row header column |
| ... | |
| <column-Z-title-1> | the title of the Zth column in which the row header appears |
| <row-header-2-definition-text> | text describing the Zth row header column |
| ... | |

The [ROW] Definition Statement

This statement presents the actual table contents, with each statement defining a row of the table, and each field a column of that row. The fields of this statement, separated by '|' and ending with a '|', are as follows:

| |
|---|
| <row-1-column-1-data> |
| <row-1-column-2-data> |
| ... |
| <row-1-column-X-data> |
| ... |
| <row-Y-column-1-data> |
| <row-Y-column-2-data> |
| ... |
| <row-Y-column-X-data> |

The [TEMPLATE] Definition Statement

This statement defines a text template for use in presenting a description or definition of an individual table entry. The fields of this statement, as for preceding statements, are separated by '|' and end with a '|'. The template is filled in using references to table entries, row headers, column titles, or general table data. Each such reference is identified in the template by the structure {<table-reference>} with the curly braces as shown, and with <table-reference> referring to one of the following:

A <column-N-data-type> as found in a [COLUMNDATA] statement. Use of this reference generates a text for each entry in the columns and rows under the name given, replacing this reference and the curly braces with the entry value.

A <column-title-N-name> as found in a [COLUMNHDR] statement. Use of this reference replaces this reference and the curly braces with the named column header value.

A <column-N-title-M> as found in a [ROWHDR] statement. Use of this reference replaces this reference and the curly braces with the named row header value.

The reference {Table Title}. Use of this reference replaces this reference and the curly braces with the title of the table found in <table-header-text>.

The reference {Table Link}. Use of this reference replaces this reference and the curly braces with the title of the table found in <table-header-text> in the [TABLEHDR] statement, as the display for an HTML link to the table itself. The <table-reference-file-name> and <text-table-name> are taken from the [TABLE] statement to construct the link's file and anchor.

The reference {Table Description}. Use of this reference replaces this reference and the curly braces with the description of the table found in <table-definition-text> in the [TABLEHDR] statement.

Building and Installing Tables

The present method and apparatus produce outputs from the table definitions in two forms, using the definitions of form and content as defined above and supplied by the author. First is the XHTML table format, which uses the conventional markup language and stylesheet definitions to build, store, and make available to the reader a tabular display of the contents of the table as defined. Second is the table element narrative format, which uses string and text processing tools to generate a separate element text description for each data element of the table. The element text descriptions generated in this manner become the entries in the glossary supplement of the present method and apparatus.

Figure 18:
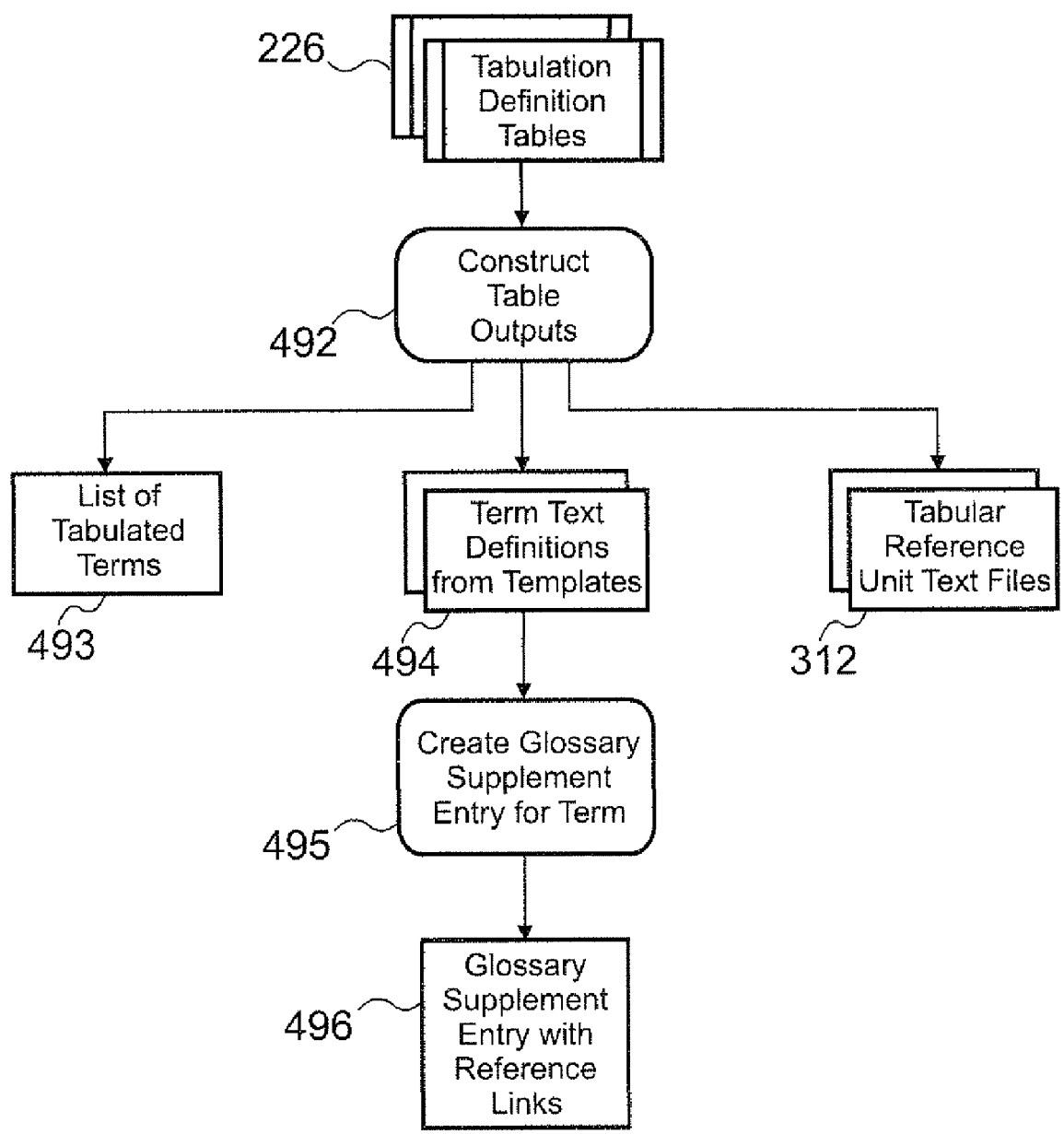
FIG. 18 shows the present method for building and installing tables, tabular text, and the glossary supplement.

See FIG. 18. To generate tables and their content presentations for readers, the present method and apparatus use the author's tabulation definition inputs (226 of FIG. 4) to construct (492) for each table an XHTML tabular reference unit text file 312, a list of table terms 493, and a database file comprised of a set of texts 494 generated from templates and data from the table's input tabulation definition inputs 226. From the set of texts 494 from all tables the present method and apparatus build (495) the glossary supplement entries 496 and then the complete glossary supplement. The XHTML tabular reference unit text file 312 is stored for inclusion, via the symbolic-inclusion process of the present method and apparatus, in one or more reference files for readers.

Integration of Improvements

The improvements described herein comprise a concerted set of enhancements to the ELM/KTT and its outputs. By its unconventional and synergistic use of ordinary and conventional methods, the present method and apparatus grant to readers and authors considerable navigational power and ease in moving from one location in the ELM/KTT to another, while preserving and enhancing the reader's attention on the topics and narratives of the author's intent.

While the present method and apparatus have been described with reference to preferred embodiments, it will be understood by those skilled in the software and related arts that various changes may be made and equivalents may be substituted for elements thereof to adapt to particular situations without departing from the scope of the present method and apparatus. Therefore, it is intended that the present method and apparatus not be limited to any particular embodiments or combination of embodiments disclosed as the basic, primary, or best mode contemplated for carrying out this invention, but that the invention will include all embodiments falling within the scope and spirit of the appended claims.

What is claimed:

1. An apparatus for providing an immersive experience for reading the content of one or more source text units, comprising:

a computer system comprising one or more processors, a display interface, at least one user input interface, and one or more data storage means for storing an operating system, at least one electronic document comprising one or more components, a database for holding a plurality of tables wherein each table includes at least information about the content of the one or more source text units and wherein the plurality of tables includes at least one unit table, at least one thread table, and at least one term table, and program instructions that, when implemented by the one or more processors, are configured to:

generate one or more lists of one or more links based on information stored in one or more of the tables wherein at least one link is to at least one starting point for reading one or more of the plurality of components of said electronic document;

generate and install one or more hypertext link anchors in one or more of said components of said electronic document based on the lists of links;

generate and install one or more hypertext links to said link anchors, in one or more of said components of said electronic document;

generate and install one or more indices in one or more components of said electronic document;

generate and install hypertext links between said indices and one or more components of said electronic document.

2. The apparatus of claim 1, wherein each said electronic document comprises an electronic literary macramé (ELM).

3. The apparatus of claim 1, wherein each said electronic document comprises a knowledge transfer tool (KTT).

4. The apparatus of claim 1, wherein each said electronic document further comprises: one or more narrative components, one or more reference components, one or more glossary components, and one or more index components.

5. The apparatus of claim 4, wherein each of the one or more reference components includes a title, and the program instructions are further configured to:

generate one or more lists of anchor links wherein each anchor link represents a reference component title;

install a hypertext link anchor at each reference component title location referenced by the list of anchor links; and compare the information stored in at least the term table to the reference component titles and, based on the results of the comparison, install a hypertext link in the one or more glossary components to one or more of the hypertext link anchors.

6. The apparatus of claim 4, wherein each of the one or more reference components further includes one or more units wherein each unit includes a title, each of the one or more glossary components includes a plurality of glossary terms wherein the terms are stored in the terms table, and wherein the program instructions are further configured to:

identify any instances of each glossary term in each reference component unit title;

install a hypertext link anchor at the reference component unit title for each identified instance; and install a hypertext link at the glossary term location in the glossary component for each identified instance wherein each of the hypertext links point to a hypertext anchor.

7. The apparatus of claim 4, wherein each of the one or more glossary components includes a plurality of glossary terms wherein the terms are stored in the terms table and wherein the program instructions are further configured to:

locate the first occurrence of each glossary term in each narrative component;

create an index list entry for each said first occurrence of each glossary term in each narrative component; and create an index entry including a hypertext link for each said index list entry, said hypertext link pointing to said first occurrence of a glossary term in each narrative component.

8. The apparatus of claim 4 wherein the program instructions are further configured to:

generate a readable data table of the one or more electronic documents from a user's tabulation definition inputs;

generate a textual entry from each datum of said readable data table; and generate the one or more glossary components from each textual entry.

9. The apparatus of claim 1, wherein the one or more source text units further includes one or more units selected from the group consisting of a scene, a story, a lesson, and a presentation and wherein each unit is identified in the unit table.

10. The apparatus of claim 1, wherein the one or more components of said electronic document includes one or more threaded narrative components and wherein the program instructions are further configured to:

generate a list of thread links to at least one starting point for reading each threaded narrative component of said electronic document; and generate an introduction page of one or more of said electronic document wherein the introduction page includes a list of hypertext links based on the list of thread links.

11. The apparatus of claim 1, wherein the one or more components of said electronic document includes one or more reference components and wherein the program instructions are further configured to:

generate a list of reference links to at least one starting point for reading said one or more reference components of said electronic document; and generate a reference menu page of one or more of said electronic document wherein the reference menu page includes a list of hypertext links based on the list of reference links.

12. The apparatus of claim 1, wherein the one or more components of said electronic document includes at least one narrative component and wherein the program instructions are further configured to:

generate one or more lists of trace links to a plurality of starting points for reading one or more traces through the at least one narrative component of said electronic document wherein the one or more traces are selected from the group consisting of a character point of view, a theme point of view, a scene in which a character makes a first appearance, and one or more scenes in which a character is present; and generate a map page of one or more of one or more of said electronic document wherein the map page includes a list of hypertext links based on the list of trace links.

13. The apparatus of claim 1, wherein the one or more tables further includes a symbolic link table and the program instructions are further configured to:

receive a user-supplied symbolic link anchor definition including a symbolic link name;

validate the symbolic link name by comparing the symbolic link name to the symbolic link anchor definitions in the symbolic link table;

insert a symbolic link anchor at a user-specified location in the one or more components;

insert a symbolic hypertext link at a user-specified location in the one or more components wherein the hypertext link points to the symbolic link anchor location associated with the validated symbolic link name; and add said symbolic link anchor definition to the symbolic link table.

14. The apparatus of claim 1 wherein the program instructions are further configured to:

receive and validate a user-supplied symbolic link anchor definition including a symbolic link name;

insert a symbolic link anchor at a user-specified location in the one or more components; and add said symbolic link anchor definition to a list of all symbolic link anchor definitions.

15. The apparatus of claim 14 wherein the program instructions are further configured to:

receive and validate a symbolic link name including comparing the symbolic link name to the symbolic link anchor definitions in the list of all symbolic link anchor definitions; and insert a symbolic hypertext link at a user-specified location in the one or more components wherein the hypertext link points to the symbolic link anchor location associated with the validated symbolic link name.

16. A method for providing an immersive experience for reading source text files by using an electronic document comprising a plurality of components, the method comprising:

providing a database for holding a plurality of tables each of which includes information about the content of the one or more source text files;

generating one or more lists of one or more links based on information stored in one or more of the tables wherein each link identifies one or more locations in one or more of the components of said electronic document;

generating and installing one or more hypertext link anchors in one or more of said components of said electronic document based on the locations identified in the lists of links; and generating and installing one or more hypertext links to said link anchors in one or more of said components of said electronic document.

17. The method of claim 16, wherein the one or more tables includes a thread table and wherein the step of generating one or more lists of hypertext links further comprises the step of generating one or more lists of hypertext thread links to at least one starting point for reading the one or more components of said electronic document according to at least one thread stored in the thread table.

18. The method of claim 17 further including the step of generating an introduction page of said electronic document wherein the introduction page includes the list of hypertext thread links.

19. The method of claim 17, wherein the thread table is configured to store one or more threads selected from the group consisting of a character point of view, a theme point of view, a scene in which a character makes a first appearance, and one or more scenes in which a character is present and wherein the step of generating one or more lists of hypertext links further comprises the step of generating a map page of said electronic document wherein the map page includes the list of hypertext thread links.

20. The method of claim 16, wherein the step of generating one or more lists of hypertext links further comprises the steps of:

generating a list of hypertext links to a location in the one or more reference components of said electronic document; and generating a reference menu page of said electronic document wherein the reference menu page includes the list of hypertext links.

21. The method of claim 16, wherein each reference component includes a title, the plurality of components further includes at least one glossary component, and the one or more tables includes at least a term table, further comprising the steps of:

generating one or more lists of anchor links wherein each anchor link references a reference component title;

installing a hypertext link anchor at each reference component title location referenced by the list of anchor links; and comparing the information stored in the term tables to the reference component titles and, based on the results of the comparison, installing a hypertext link in the one or more glossary components to one or more of the hypertext link anchors.

22. The method of claim 16, wherein the one or more tables further includes a symbolic link table, the method further comprises the steps of:

receiving a user-supplied symbolic link anchor definition including a symbolic link name;

validating the symbolic link name by comparing the symbolic link name to the symbolic link anchor definitions in the symbolic link table;

inserting a symbolic link anchor at a user-specified location in the one or more components;

inserting a symbolic hypertext link at a user-specified location in the one or more components wherein the hypertext link points to the symbolic link anchor location associated with the validated symbolic link name; and adding said symbolic link anchor definition to the symbolic link table.

23. The method of claim 16, wherein the step of generating and installing one or more hypertext links in one or more components of an electronic document further comprises the steps of:

generating a list of hypertext link anchors to one or more named parts of one or more reference components of an electronic document;

installing said list of hypertext link anchors to one or more named parts of one or more reference components of an electronic document in said reference component;

identifying each glossary term in one or more glossary components of said electronic document which matches the name of said named parts of said one or more reference components of said electronic document; and installing a hypertext link to each of said hypertext anchors in said one or more parts of one or more reference components of an electronic document in text of said glossary term which matches said name.

24. The method of claim 23, further comprising the step of using tabular data to generate one or more glossary terms in one or more glossary components of an electronic document.

25. The method of claim 16, further comprising the step of selecting one of two hypertext links from the display of a single hypertext link.

26. The method of claim 25 wherein the step of selecting one of two hypertext links from the display of a single hypertext link further comprises the steps of:

selecting a first hypertext link from the display of said single hypertext link based on a first selection event; and selecting a second hypertext link from the display of said single hypertext link based on a second selection event.

27. The method of claim 16, wherein the step of defining, generating, and installing one or more indices in an electronic document further comprises the steps of:

locating the first occurrence of each glossary term in each narrative component of said electronic document;

creating an index list entry for each said first occurrence of each glossary term in each narrative component of said electronic document; and creating an index entry containing a hypertext link for each said index list entry, said hypertext link pointing to said first occurrence of a glossary term in said narrative component of said electronic document.

28. The method of claim 16, wherein the step of defining, generating, and installing one or more indices in an electronic document further comprises the steps of:

locating the first occurrence of each glossary term in each paragraph of each narrative component of said electronic document;

generating and installing a hypertext link anchor in said paragraph of said each narrative component of an electronic document;

creating an index list entry for each said first occurrence of each glossary term in each paragraph of each narrative component of said electronic document; and creating an index entry containing a hypertext link for each said index list entry, said hypertext link pointing to said hypertext link anchor in said first occurrence of said glossary term in said each paragraph of said each narrative component of said electronic document.

29. The method of claim 16, wherein the step of defining, generating, and installing one or more indices in an electronic document further comprises the steps of:

installing a hypertext link in each index entry in each said index for a term pointing to the glossary entry for said term in said electronic document; and installing a hypertext link in each glossary entry for a term in each glossary in said electronic document pointing to the index entry for said term in said electronic document.

30. The method of claim 16 further comprising the steps of:

defining and installing one or more symbolic directives in one or more components of an electronic document; and interpreting said one or more symbolic directives in one or more components of said electronic document.

31. The method of claim 30 wherein the step of defining and installing one or more symbolic directives in one or more components of an electronic document further comprises the steps of:

defining and installing one or more symbolic link anchors in one or more components of an electronic document;

defining and installing one or more symbolic links in one or more components of an electronic document; and defining and installing one or more symbolic file inclusion directives in one or more components of an electronic document.

32. The method of claim 31 wherein the step of defining and installing one or more symbolic link anchors in one or more components of an electronic document further comprises the steps of:

validating a user-supplied symbolic link anchor definition;

inserting said symbolic link anchor definition at a user-specified location in a component of an electronic document; and adding said symbolic link anchor definition to a list of all symbolic link anchor definitions for said electronic document.

33. The method of claim 31 wherein the step of defining and installing one or more symbolic links in one or more components of an electronic document further comprises the steps of:

validating a user-supplied symbolic link definition;

inserting said symbolic link definition at a user-specified location in a component of an electronic document; and adding said symbolic link definition to a list of all symbolic link definitions for said electronic document.

34. The method of claim 31 wherein the step of defining and installing one or more symbolic file inclusion directives in one or more components of an electronic document further comprises the steps of:

validating a user-supplied symbolic file inclusion definition;

inserting said symbolic file inclusion definition at a user-specified location in a component of an electronic document; and adding said symbolic file inclusion definition to a list of all symbolic link definitions for said electronic document.

35. The method of claim 16 wherein the step of interpreting said one or more symbolic directives in one or more components of said electronic document further comprises the steps of:

converting each symbolic link anchor definition in an electronic document to a corresponding hypertext link anchor;

converting each symbolic link definition in an electronic document to a corresponding hypertext link;

replacing each symbolic file inclusion definition in an electronic document with the contents of the file identified in the file inclusion definition;

using symbolic file inclusion directives in one or more components of an electronic document to install one or more lists of hypertext links in said one or more components of said electronic document; and using symbolic file inclusion directives in one or more components of an electronic document to install one or more readable tables in said one or more components of said electronic document.

36. The method of claim 16 further comprising the step of defining and installing one or more readable tables in one or more components of an electronic document.

37. The method of claim 36 wherein the step of defining and installing one or more readable tables in one or more components of an electronic document further comprises the steps of:

constructing a readable data table of an electronic document from a user's tabulation definition inputs;

constructing a textual entry from each datum of said readable data table; and creating a glossary component of an electronic document from all said textual entries from all data of all said readable data tables.

38. An apparatus for providing an immersive experience for reading an electronic literary macramé (ELM), comprising:

a computer system comprising one or more processors, a display interface, at least one user input interface, and one or more data storage means for storing an operating system, at least one electronic document comprising the ELM, wherein the electronic document comprises a plurality of components including at least a narrative component, a glossary component, and a reference component, a database including one or more tables including at least one unit table, at least one thread table, and at least one term table, and program instructions that, when implemented by the one or more processors, are configured to:

generate a plurality of lists of one or more links based on information stored in one or more of the tables;

generate and install one or more hypertext link anchors in one or more of said components of said electronic document based on the lists of links;

generate and install one or more hypertext links to said link anchors in one or more of said components of said electronic document; and wherein the lists include a list of one or more links for each unit included in the unit table, a list of one or more links for each thread included in the thread table, and a list of one or more links for each term included in the term table.

39. The apparatus of claim 38 wherein each of the components comprises a plurality of units wherein the units are each identified in the unit table and wherein each of the threads included in the threads tables is configured to reference a sequence of units.

40. The apparatus of claim 38 wherein the glossary component is configured to include an entry for each term included in the term table and wherein the list of links for each term includes location information for each occurrence of each term in the narrative and reference components.

* * * * *